United States Patent [19]
Tanaka

[11] Patent Number: 5,507,839
[45] Date of Patent: Apr. 16, 1996

[54] DYE FIXING METHOD

[75] Inventor: Mitsugu Tanaka, Kanagawa, Japan

[73] Assignee: Fuji Photo Film Co., Ltd., Kanagawa, Japan

[21] Appl. No.: 346,195

[22] Filed: Nov. 22, 1994

[30] Foreign Application Priority Data

Nov. 22, 1993 [JP] Japan ................................. 5-315990

[51] Int. Cl.⁶ ..................................................... D06P 5/00
[52] U.S. Cl. ........................ 8/493; 8/512; 8/471; 8/495; 427/333; 427/400; 503/227; 106/22 R
[58] Field of Search ............................... 8/512, 493, 471; 427/330, 400; 503/227; 106/22 R

[56] References Cited

FOREIGN PATENT DOCUMENTS

| 6-64343 | 3/1994 | Japan . |
| 6-106861 | 4/1994 | Japan . |
| 6-99674 | 4/1994 | Japan . |
| 6-99671 | 4/1994 | Japan . |
| 2159971 | 12/1985 | United Kingdom . |

OTHER PUBLICATIONS

Database WPI, Section Ch, Week 9420, Derwent Publications Ltd., London, GB; Class A89, AN 94–163658 & JP–A–6 106 861 (Fuji Photo Film Co., Ltd.) 19 Apr. 1994.
Database WPI, Section Ch, Week 9419, Derwent Publications Ltd., London, GB; Class E24, AN 94–156365 & JP–A–6 099 675 (Fuji Photo Film Co., Ltd.) 12 Apr. 1994.

*Primary Examiner*—Margaret Einsmann
*Attorney, Agent, or Firm*—Sughrue, Mion, Zinn, Macpeak & Seas

[57] ABSTRACT

A dye is fixed to a solid material by using a diene or dienophile as the dye, incorporating a dienophile or diene into the solid material, effecting Diels-Alder reaction between the diene and the dienophile or between the dye and the solid material for binding the dye to the solid material. The dyed solid material has an increased dye concentration and prevents dye diffusion with the lapse of time.

6 Claims, No Drawings

DYE FIXING METHOD

BACKGROUND OF THE INVENTION

1. Field of the Invention

This invention relates to a novel dye fixing method for binding dyes to solid materials utilizing Diels-Alder reaction.

2. Prior Art

Binding or fixation of dyes to solid materials is used in a variety of applications, for example, sublimation type thermal transfer processes, silver salt color diffusion transfer processes, ink jet recording processes, and dyeing processes.

For acceptable binding, an increased binding rate and/or a high binding concentration is required. It is also essential that after dye binding, the dye is immobile with the lapse of time. Those dyes having a low molecular weight are likely to diffuse into solid material and thus easy to bind, but they are undesirably mobile after binding with the lapse of time. Inversely, those dyes which remain immobile after binding with the lapse of time are difficult to bind.

A number of solutions to the above-mentioned problem have been proposed. Such proposals include Japanese Patent Application Laid-Open (JP-A) Nos. 64591/1982, 78893/1984, 260060/1985, 260381/1985, 260391/1985, and 97887/1987, Japanese Patent Publication (JP-B) No. 11678/1987, International Symposium on Polymeric Amine and Ammonium Salts, (1979.1X.24–26), pp. 145–148, Photogr. Sci. Eng., 20, 155 (1976), and J. Soc. Dyers & Colourists, 79, 21 (1963). However, none of them are satisfactory.

SUMMARY OF THE INVENTION

An object of the present invention is to provide a novel method for fixing a dye to a solid material utilizing Diels-Alder reaction, with the advantages of ease of dye binding and prohibited diffusion of the once bound dye with the lapse of time.

According to the present invention, there is provided a method for binding a dye to a solid material utilizing Diels-Alder reaction comprising the steps of using a dye having a diene moiety as the dye, incorporating a dienophile into the solid material, and effecting Diels-Alder reaction between the diene and the dienophile for fixing the dye to the solid material.

Preferably the dye having a diene moiety is of the following general formula (I):

$$A—(B—X)_n \qquad (I)$$

wherein A is a dye main portion,

B is a valence bond or a divalent linkage group,

X is $CR^1(R^2)=CR^3—CR^4=CR^5(R^6)$ wherein $R^1$, $R^2$, $R^3$, $R^4$, $R^5$, and $R^6$ are independently selected from a hydrogen atom and a group of non-metallic atoms, at least one of combinations $R^1$ and $R^5$, $R^3$ and $R^4$, $R^1$ and $R^2$, $R^1$ and $R^3$ (or $R^2$ and $R^3$), and $R^4$ and $R^5$ (or $R^4$ and $R^6$), taken together, may form a ring, B may be attached to X at any one of $R^1$ to $R^6$ of X, or B may be directly attached to the diene skeleton instead of any one of $R^1$ to $R^6$, and letter n is an integer of 1 to 3, and the dienophile is a compound of the following general formula (II):

$$CR^7(R^8)=CR^9(R^{10}) \qquad (II)$$

wherein $R^7$, $R^8$, $R^9$, and $R^{10}$ are independently selected from a hydrogen atom and a group of non-metallic atoms, with the proviso that all of $R^7$ to $R^{10}$ are not hydrogen atoms, at least one of combinations $R^7$ and $R^9$ (or $R^7$ and $R^{10}$), $R^7$ and $R^8$, $R^9$ and $R^{10}$, and $R^8$ and $R^9$ (or $R^8$ and $R^{10}$), taken together, may form a ring, or a compound of the following general formula (III):

$$CR^{11}{\equiv}CR^{12} \qquad (III)$$

wherein $R^{11}$ and $R^{12}$ are independently selected from a hydrogen atom and a group of non-metallic atoms, with the proviso that both of $R^{11}$ and $R^{12}$ are not hydrogen atoms.

In another aspect, the present invention binds a dye to a solid material by using a dye having a dienophile moiety as the dye, incorporating a diene into the solid material, and effecting Diels-Alder reaction between the diene and the dienophile for fixing the dye to the solid material.

Preferably the dye having a dienophile moiety is of the following general formula (IV):

$$A—(B—Y)_n \qquad (IV)$$

wherein

A is a dye main portion,

B is a valence bond or a divalent linkage group,

Y is $CR^{13}(R^{14})=CR^{15}(R^{16})$ or $CR^{17}{\equiv}CR^{18}$ wherein $R^{13}$, $R^{14}$, $R^{15}$, $R^{16}$, $R^{17}$, and $R^{18}$ are independently selected from a hydrogen atom and a group of non-metallic atoms, when Y is $CR^{13}(R^{14})=CR^{15}(R^{16})$, at least one of combinations $R^{13}$ and $R^{15}$ (or $R^{13}$ and $R^{16}$), $R^{13}$ and $R^{14}$, $R^{15}$ and $R^{16}$, and $R^{14}$ and $R^{16}$ (or $R^{14}$ and $R^{15}$), taken together, may form a ring, and when Y is $CR^{17}{\equiv}CR^{18}$, $R^{17}$ and $R^{18}$ taken together may form a ring, B may be attached to Y at any one of $R^{13}$ to $R^{18}$ of Y, or B may be directly attached to the dienophile skeleton instead of any one of $R^{13}$ to $R^{18}$, and letter n is an integer of 1 to 3, and the diene is a compound of the following general formula (V):

$$CR^{19}(R^{20})=CR^{21}—CR^{22}=CR^{23}(R^{24}) \qquad (V)$$

wherein $R^{19}$, $R^{20}$, $R^{21}$, $R^{22}$, $R^{23}$, and $R^{24}$ are independently selected from a hydrogen atom and a group of non-metallic atoms, with the proviso that all of $R^{19}$ to $R^{24}$ are not hydrogen atoms, at least one of combinations $R^{19}$ and $R^{23}$ (or $R^{20}$ and $R^{23}$), $R^{21}$ and $R^{22}$, $R^{19}$ and $R^{20}$, $R^{23}$ and $R^{24}$, and $R^{20}$ and $R^{24}$ (or $R^{19}$ and $R^{24}$), taken together, may form a ring.

The dyes used herein include those dyes having absorption in a near infrared band.

DETAILED DESCRIPTION OF THE INVENTION

The dye fixing method of the present invention utilizes Diels-Alder reaction. The Diels-Alder reaction is to react a diene with a dienophile to form an addition product in the form of a six-membered ring as described in, for example, Francesco Fringuelli and Aldo Taticchi, "Dienes in the Diels-Alder Reaction", 1990, John Wiley & Sons, Inc. As compared with the diene and dienophile alone, the addition product has a larger molecular weight is difficultly diffusible. The Diels-Alder reaction has the advantage that reaction promptly proceeds only with the aid of heat (and even at room temperature) without a need for catalysts such as acids and bases and the resulting addition product is stable.

When a dye or coloring substance is bound to a solid material, typically a fixing material, the present invention requires that if the dye is a diene, a dienophile is incorporated in the solid material whereby the two components are reacted according to Diels-Alder reaction. Alternatively, if the dye is a dienophile, a diene is incorporated in the solid material whereby the two components are reacted according to Diels-Alder reaction. In either way, the dye can be fixed to the solid material. The dye once penetrated in the solid material, depending on whether the dye is a diene or dienophile, reacts with the dienophile or diene in the solid material to convert into a dye having a six-membered ring addition product which has an increased molecular weight and is less diffusible. This prevents the once bound dye from diffusing and moving as time goes by. Prior to reaction, the dye has a low molecular weight and is diffusible. Then dyeing can occur at an increased binding rate.

Since the diene or dienophile component to be reacted with the dye in the solid material generally has a non-diffusing or ballast group, the dye after reaction becomes more difficultly diffusible due to the non-diffusing group.

The above-mentioned Diels-Alder reaction is represented by the following schemes.

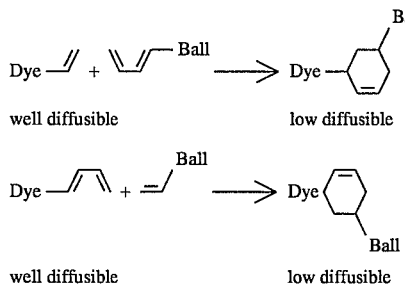

Note that Dye is a dye portion and Ball is a non-diffusing group.

The invention thus enables both ease of dyeing and controlled diffusion and migration of the dye after binding which were deemed difficult to achieve at the same time in the prior dye binding art. Although Diels-Alder reaction is per se known reaction as mentioned above, application of Diels-Alder reaction to dye binding is not known. It is unexpected as well that advantages as mentioned above are obtained when Diels-Alder reaction is applied to dye binding.

It will be understood that a compound produced by Diels-Alder reaction can be identified, for example, by extracting the Diels-Alder reaction product from the solid material with a suitable solvent (e.g., acetone), isolating and purifying the product as by column chromatography, and analyzing the pure product by nuclear magnetic resonance (NMR) spectrometry or mass spectrometry.

The diene moiety of the diene and the dienophile moiety of the dienophile used herein may be selected from known diene and dienophile moieties conventionally used in Diels-Alder reaction (including hetero-Diels-Alder reaction wherein a hereto-atom portion participates in the reaction). The term "diene" covers compounds having conjugated double bonds (1,3-diene).

In one embodiment wherein a diene is used as the dye, a combination of a dye represented by the general formula (I) and a dienophile represented by the general formula (II) or (III) is preferred.

General formula (I):

$$A—(B—X)_n$$

In formula (I), A is a dye main portion or dye portion, B is a valence bond or a divalent linkage group, and X is a diene portion and represented by $CR^1(R^2)=CR^3—CR^4=CR^5(R^6)$. Each of $R^1$, $R^2$, $R^3$, $R^4$, $R^5$, and $R^6$ is a hydrogen atom or a group of non-metallic atoms. At least one of combinations $R^1$ and $R^5$, $R^3$ and $R^4$, $R^1$ and $R^2$, $R^5$ and $R^6$, $R^1$ and $R^3$ (or $R^2$ and $R^3$), and $R^4$ and $R^5$ (or $R^4$ and $R^6$), taken together, may form a ring such as carbocyclic rings and heterocyclic rings (e.g. furan). B may be attached to X at any one of $R^1$ to $R^6$ of X, or B may be directly attached to the diene skeleton instead of any one of $R^1$ to $R^6$. Most preferably B is attached to X through $R^1$ or $R^2$. Letter n is an integer of 1 to 3.

General formula (II):

$$CR^7(R^8)=CR^9(R^{10})$$

In formula (II), each of $R^7$, $R^8$, $R^9$, and $R^{10}$ is a hydrogen atom or a group of non-metallic atoms, with the proviso that all of $R^7$ to $R^{10}$ are not hydrogen atoms. At least one of combinations $R^7$ and $R^9$ (or $R^7$ and $R^{10}$), $R^7$ and $R^8$, $R^9$ and $R^{10}$, and $R^8$ and $R^9$ (or $R^8$ and $R^{10}$), taken together, may form a ring such as carbocyclic rings and heterocyclic rings (e.g. maleimide).

General formula (III):

$$CR^{11}\equiv CR^{12}$$

In formula (III), each of $R^{11}$ and $R^{12}$ is a hydrogen atom or a group of non-metallic atoms, with the proviso that both of $R^{11}$ and $R^{12}$ are not hydrogen atoms. $R^{11}$ and $R^{12}$ taken together may form a ring such as carbocyclic and heterocyclic rings.

In another embodiment wherein a dienophile is used as the dye, a combination of a dye represented by the general formula (IV) and a diene represented by the general formula (V) is preferred.

General formula (IV):

$$A—(B—Y)_n$$

In formula (IV), A, B, and n are as defined in formula (I). Y is $CR^{13}(R^{14})=CR^{15}(R^{16})$ or $CR^{17}\equiv CR^{18}$. Each of $R^{13}$, $R^{14}$, $R^{15}$, $R^{16}$, $R^{17}$, and $R^{18}$ is a hydrogen atom or a group of non-metallic atoms. When Y is $CR^{13}(R^{14})=CR^{15}(R^{16})$, at least one of combinations $R^{13}$ and $R^{15}$ (or $R^{13}$ and $R^{16}$), $R^{13}$ and $R^{14}$, $R^{15}$ and $R^{16}$, and $R^{14}$ and $R^{16}$ (or $R^{14}$ and $R^{15}$), taken together, may form a ring such as carbocyclic rings and heterocyclic rings (e.g., maleimide). When Y is $CR^{17}\equiv CR^{18}$, $R^{17}$ and $R^{18}$ taken together may form a ring such as carbocyclic and heterocyclic rings. B may be attached to Y at any one of $R^{13}$ to $R^{18}$ of Y, or B may be directly attached to the dienophile skeleton instead of any one of $R^{13}$ to $R^{18}$.

General formula (V):

$$CR^{19}(R^{20})=CR^{21}—CR^{22}=CR^{23}(R^{24})$$

In formula (V), each of $R^{19}$, $R^{20}$, $R^{21}$, $R^{22}$, $R^{23}$, and $R^{24}$ is a hydrogen atom or a group of non-metallic atoms, with the proviso that all of $R^{19}$ to $R^{24}$ are not hydrogen atoms. At least one of combinations $R^{19}$ and $R^{23}$ (or $R^{20}$ and $R^{23}$), $R^{21}$ and $R^{22}$, $R^{19}$ and $R^{20}$, $R^{23}$ and $R^{24}$, and $R^{20}$ and $R^{24}$ (or $R^{19}$ and $R^{24}$), taken together, may form a ring such as carbocyclic rings and heterocyclic rings (e.g., furan).

Useful examples of the above-defined dye (which is a diene or dienophile) and the dienophile or diene to be reacted therewith are shown below. In this regard, it is noted that Japanese Patent Application No. 89462/1993 also shows these examples.

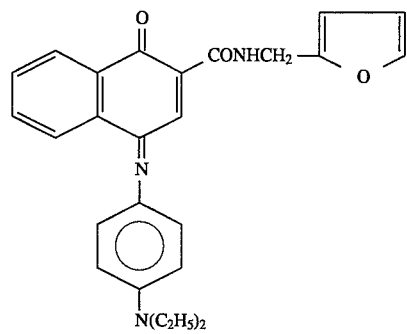

I-1

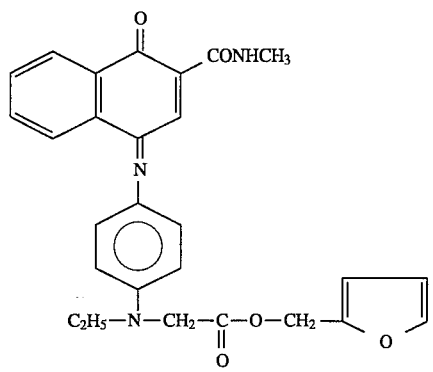

I-2

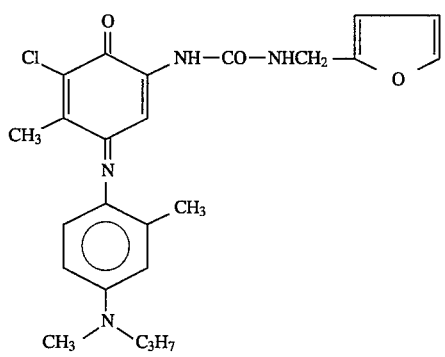

I-3

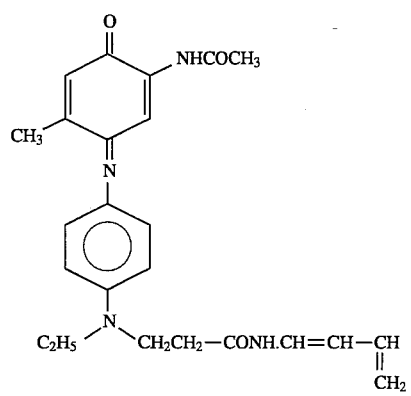

I-4

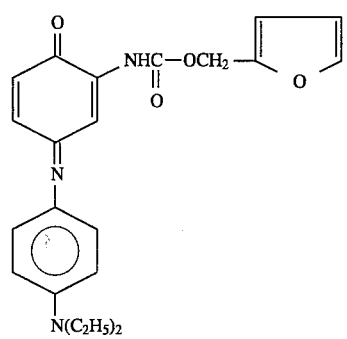

I-5

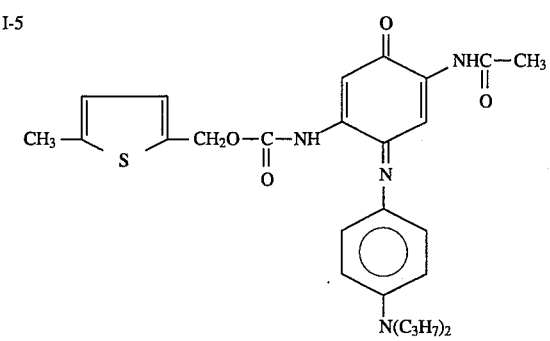

I-6

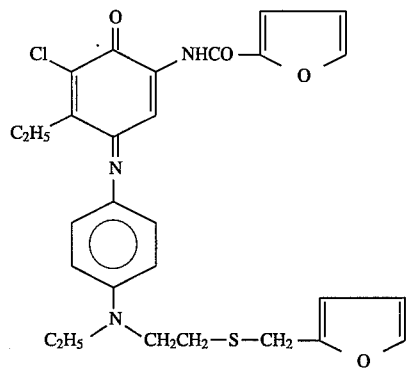

I-7

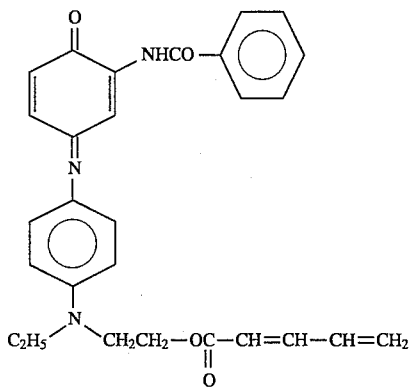

I-8

I-9
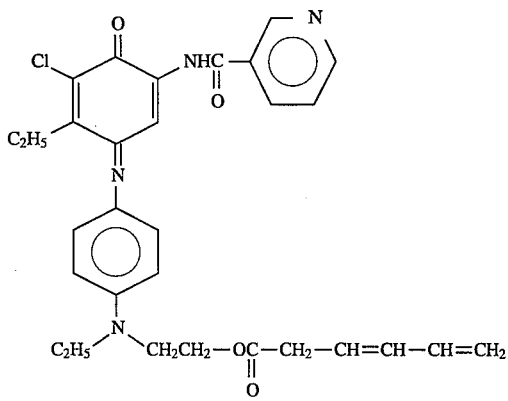
I-10
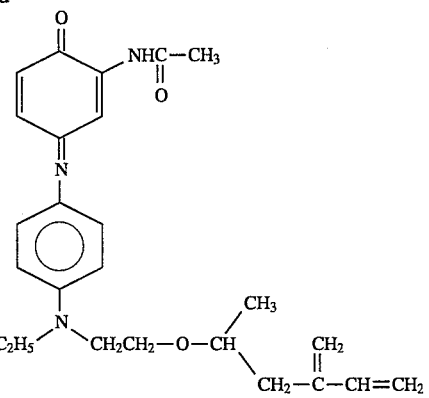
I-11
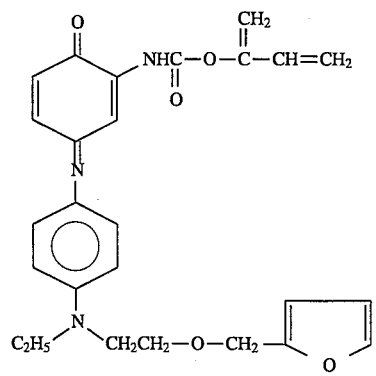
I-12
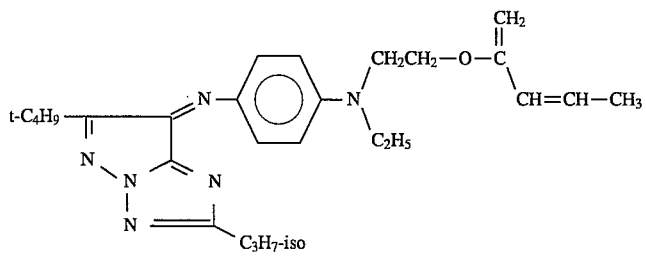
I-13
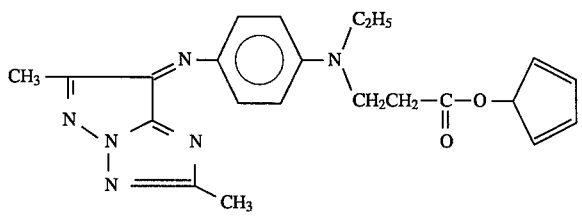
I-14
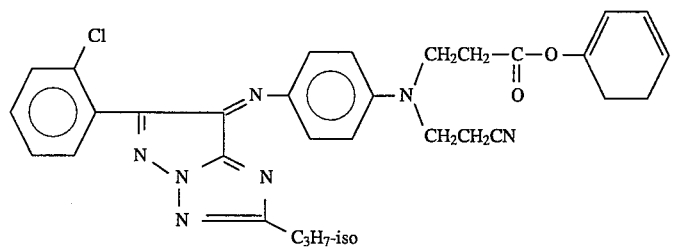

-continued
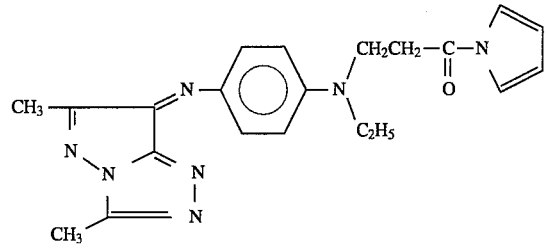
I-15
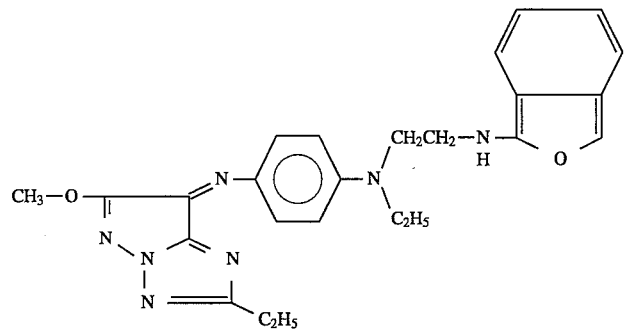
I-16
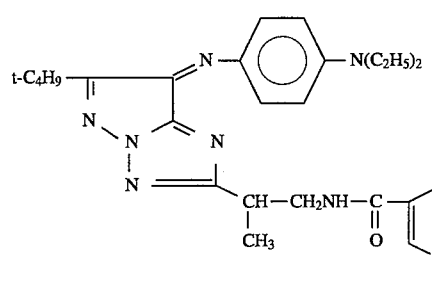
I-17
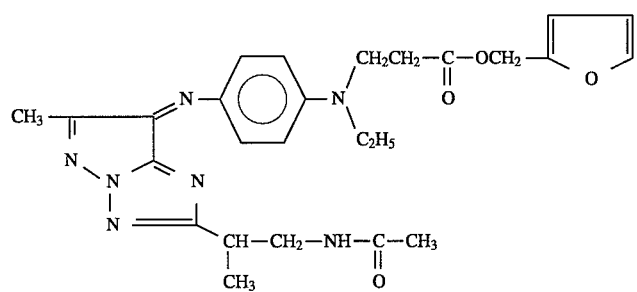
I-18
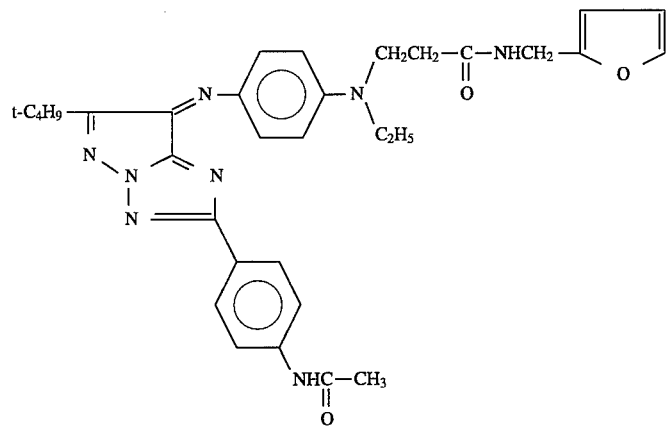
I-19

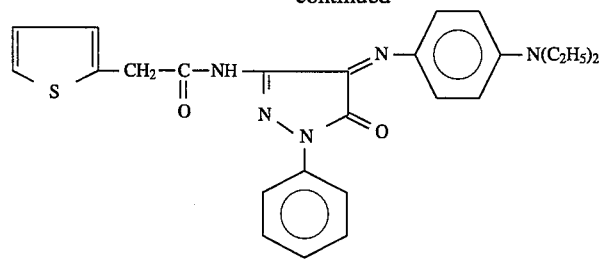
I-20
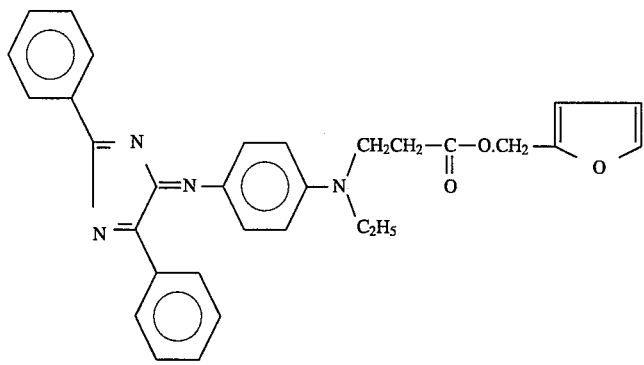
I-21
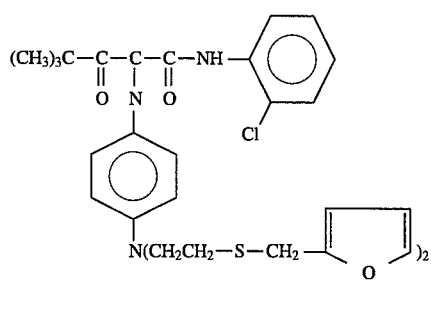
I-22
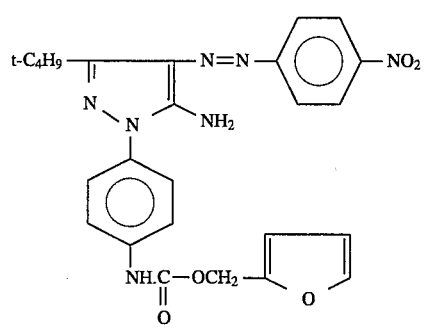
I-23
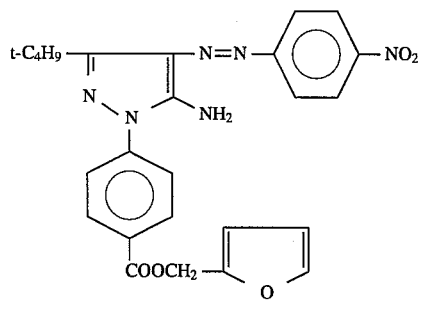
I-24
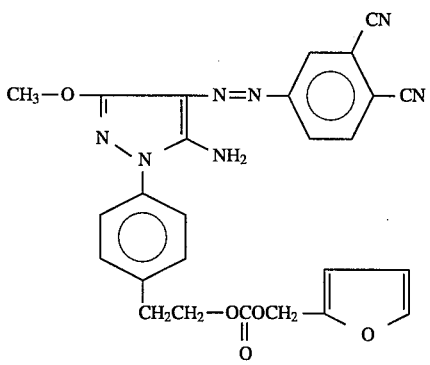
I-25
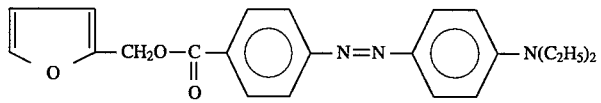
I-26
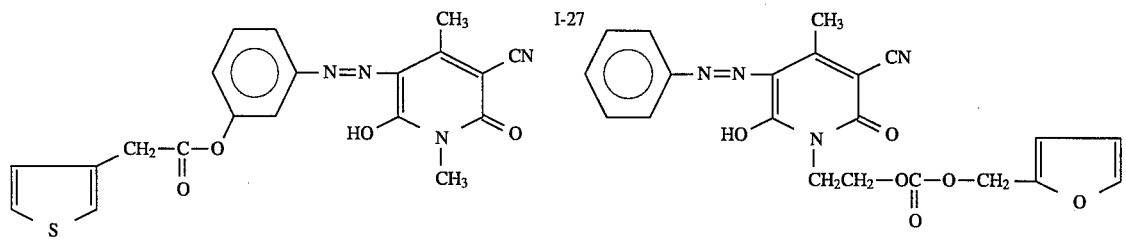
I-27    I-28

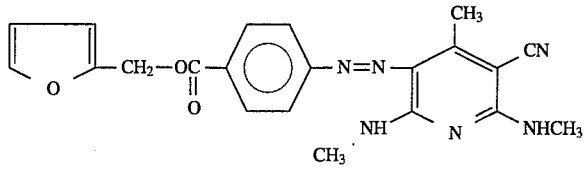
I-29
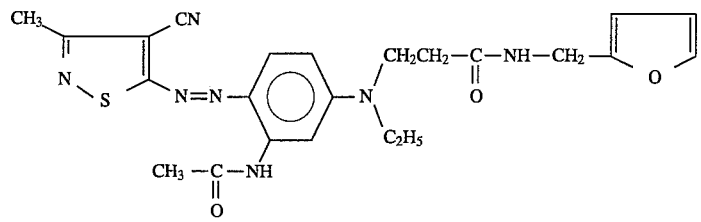
I-30
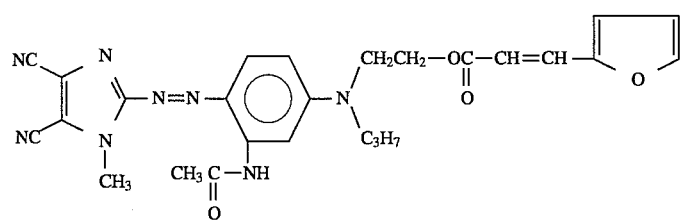
I-31
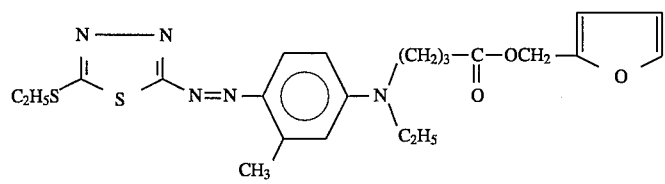
I-32
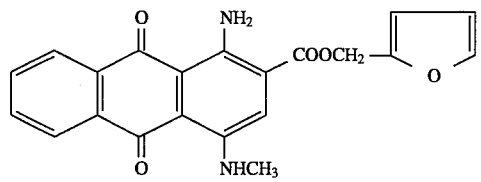
I-33
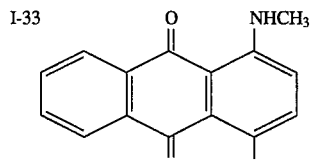
I-34
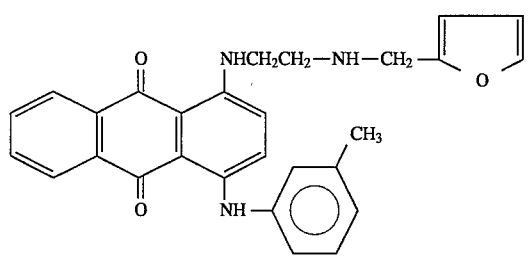
I-35
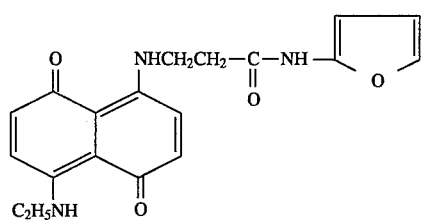
I-36
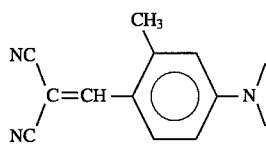
I-37
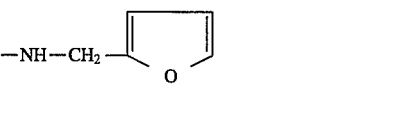
I-38

-continued
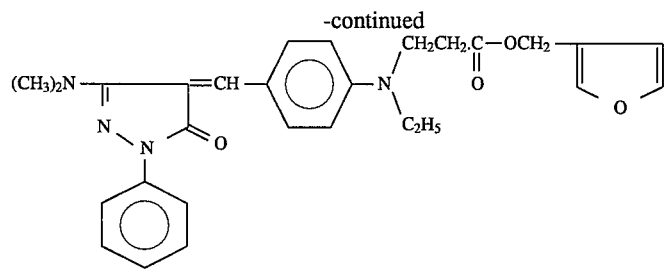
I-39
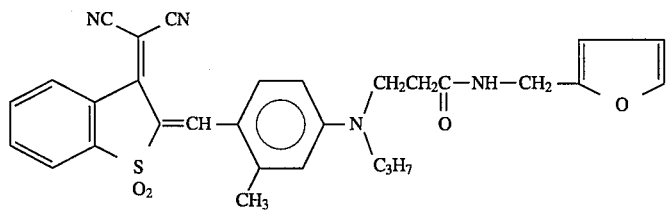
I-40
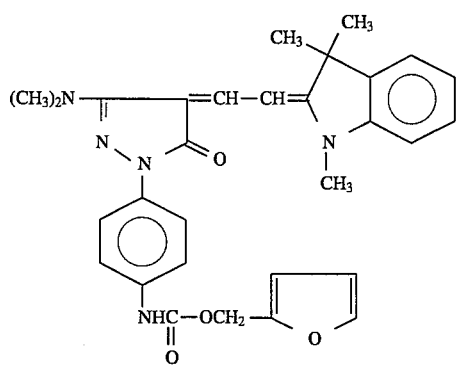
I-41
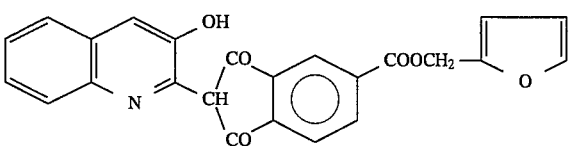
I-42
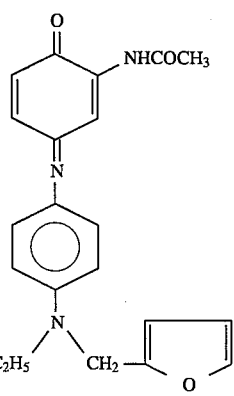
I-43
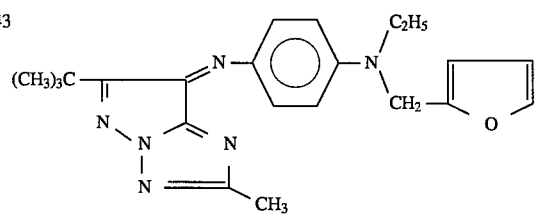
I-44
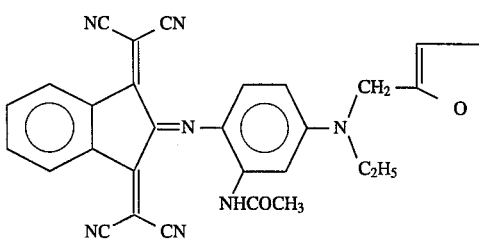
I-45
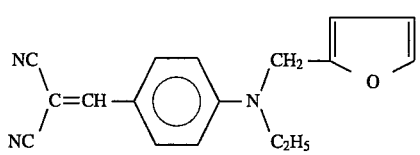
I-46

-continued
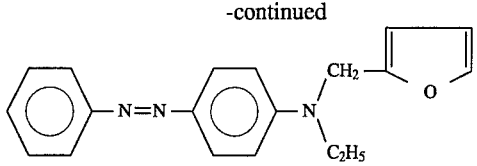
I-47
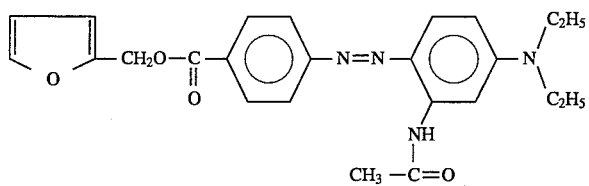
I-48
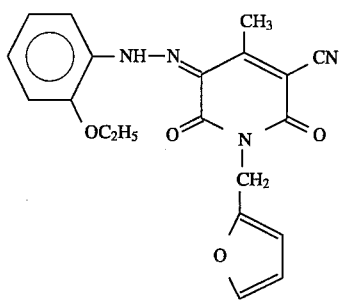
I-49
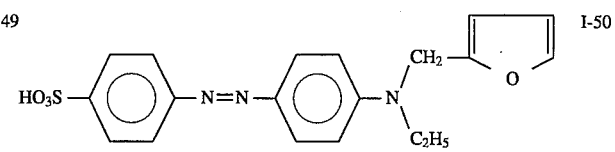
I-50
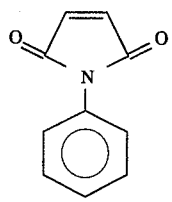
II-1
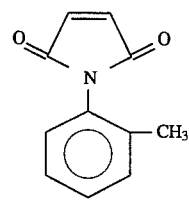
II-2
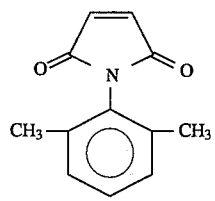
II-3
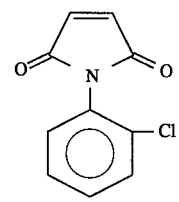
II-4
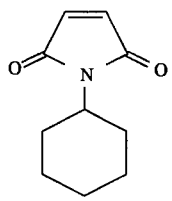
II-5
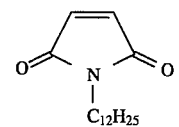
II-6
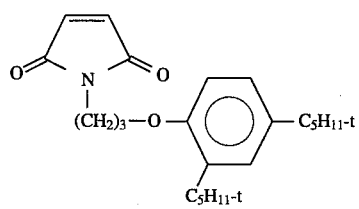
II-7
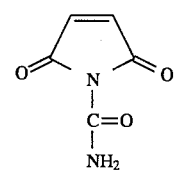
II-8
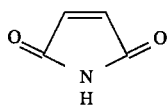
II-9
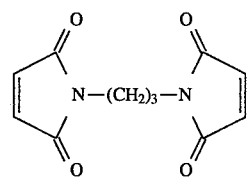
II-10

-continued
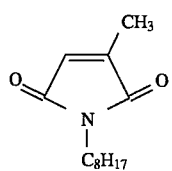
II-11
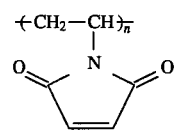
II-12
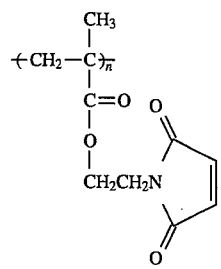
II-13
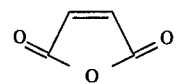
II-14
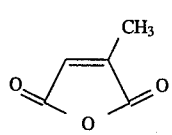
II-15
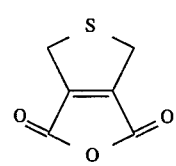
II-16
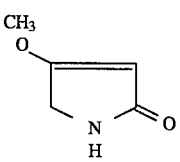
II-17
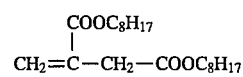
II-18
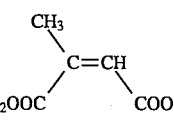
II-19
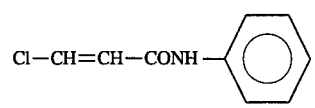
II-20
$CH_2=CH-COOC_{12}H_{25}$
II-21
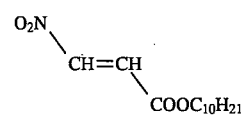
II-22
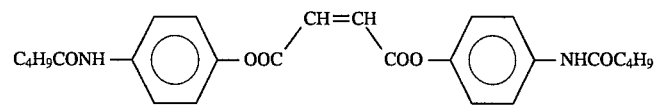
II-23
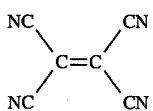
II-24
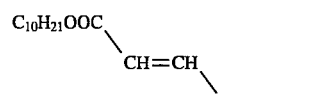
II-25
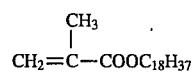
II-26
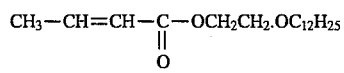
II-27
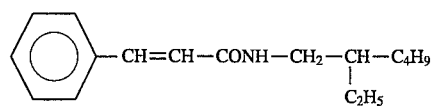
II-28
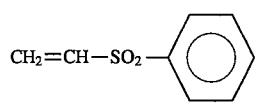
II-29
II-30
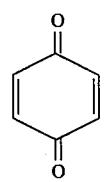
II-31

II-32 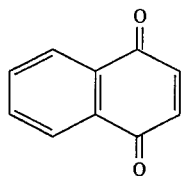
II-33 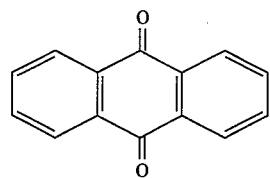
II-34 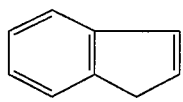
II-35 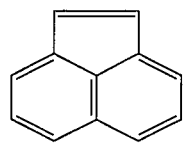
II-36 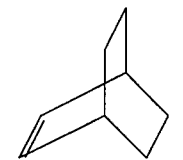
II-37 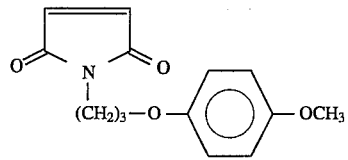
II-38 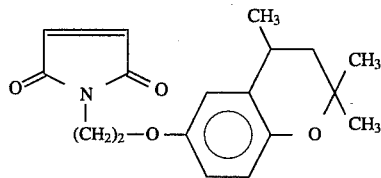
II-39 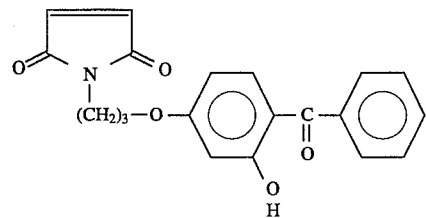
II-40 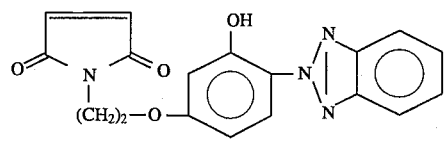
II-41 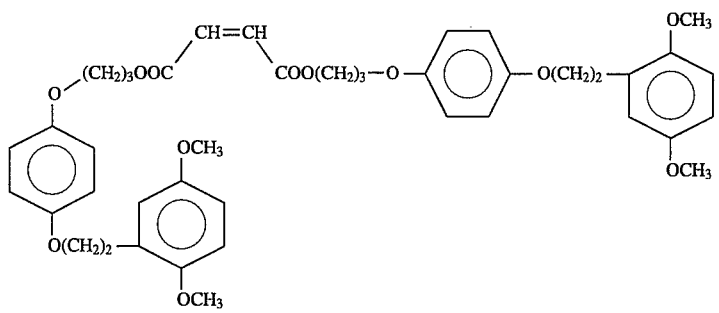
II-42 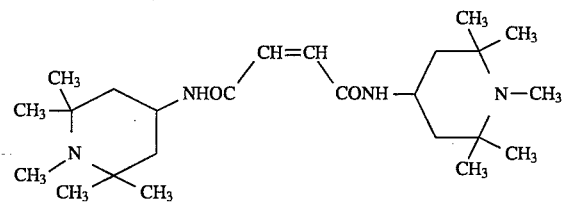
II-43 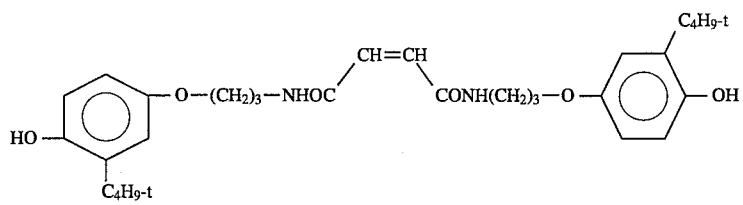

-continued
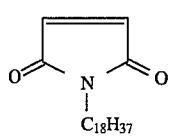
II-44
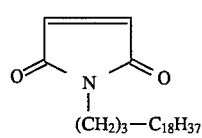
II-45
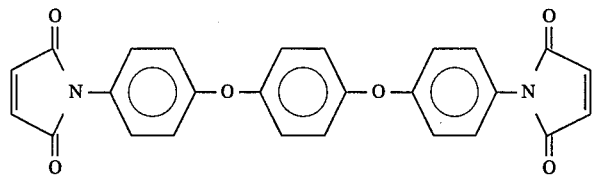
II-46
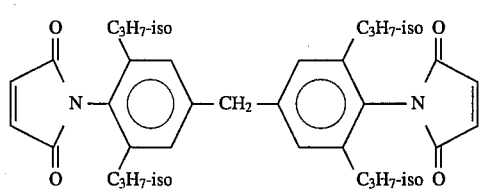
II-47
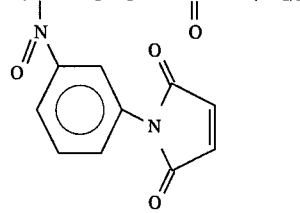
II-48
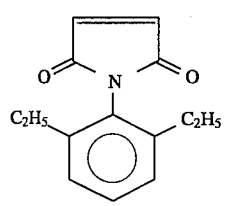
II-49
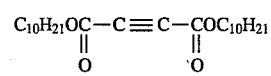
III-1
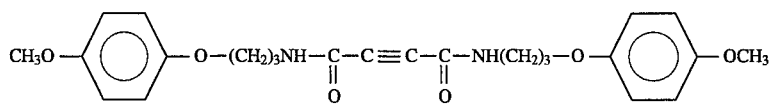
III-2
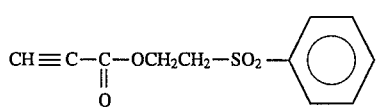
III-3
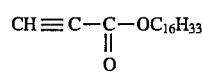
III-4
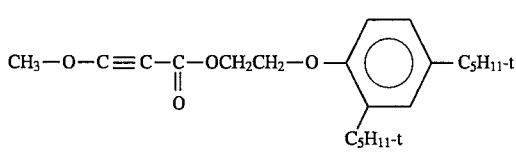
III-5
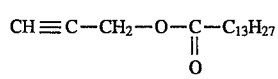
III-6
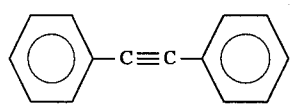
III-7
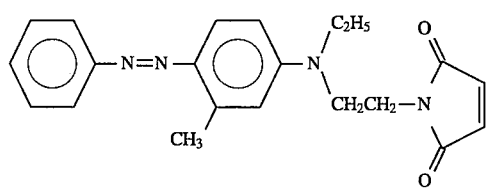
IV-1
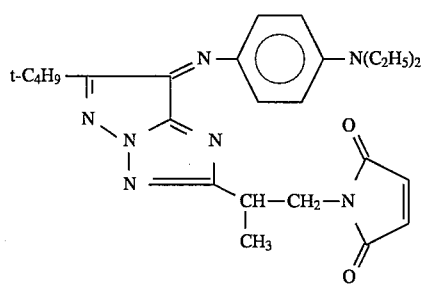
IV-2
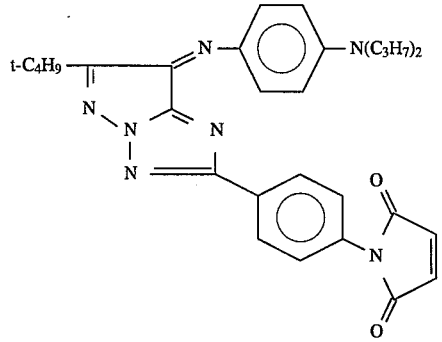
IV-3

-continued
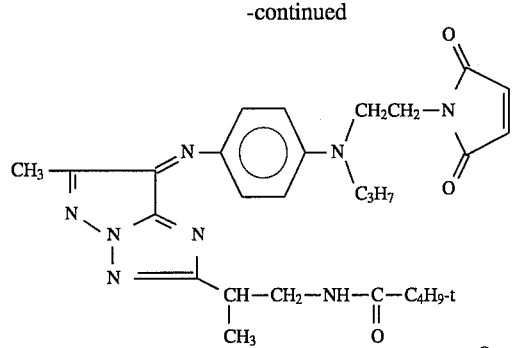
IV-4
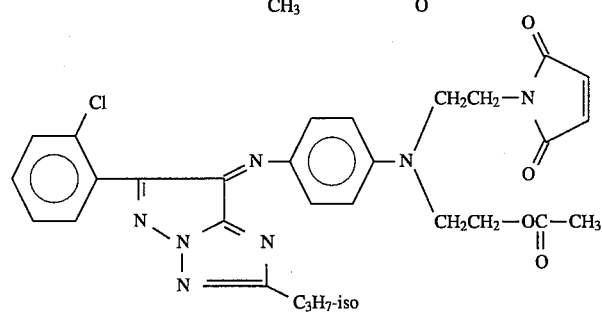
IV-5
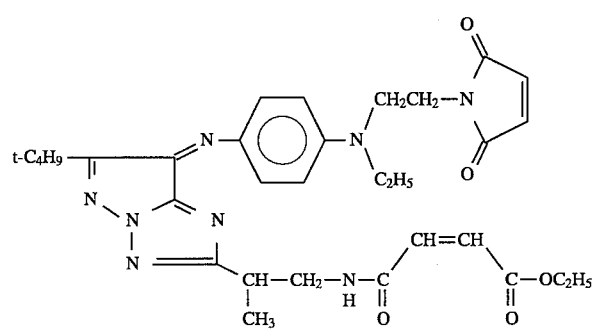
IV-6
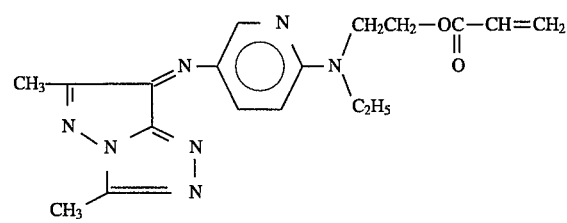
IV-7
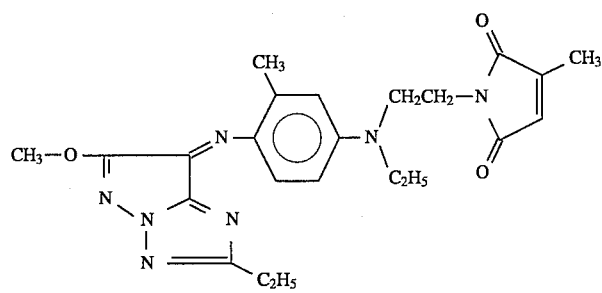
IV-8

-continued
IV-9
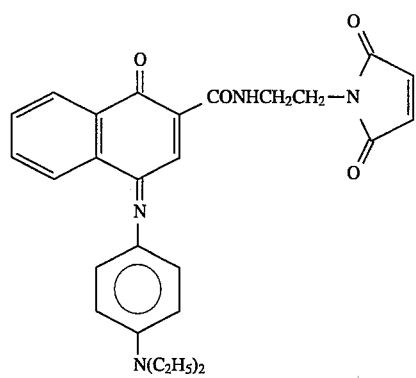
IV-10
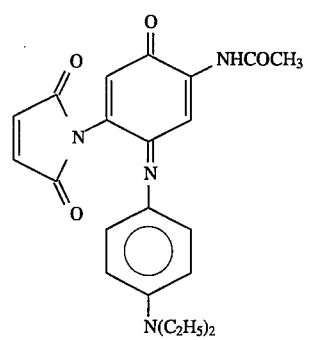
IV-11
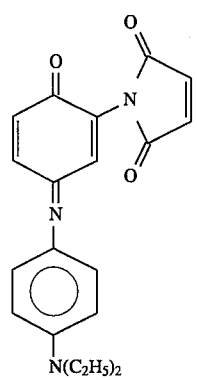
IV-12
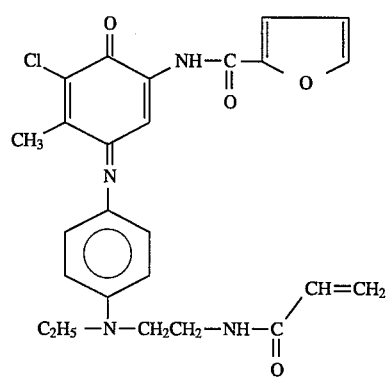
IV-13
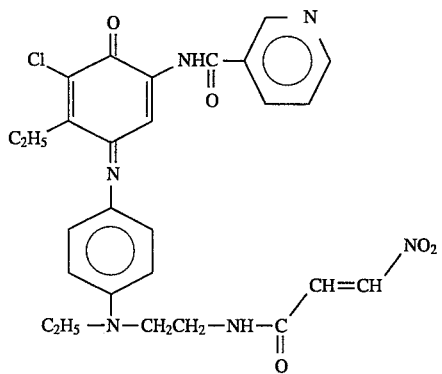
IV-14
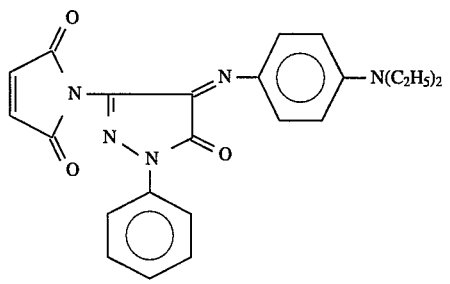
IV-15
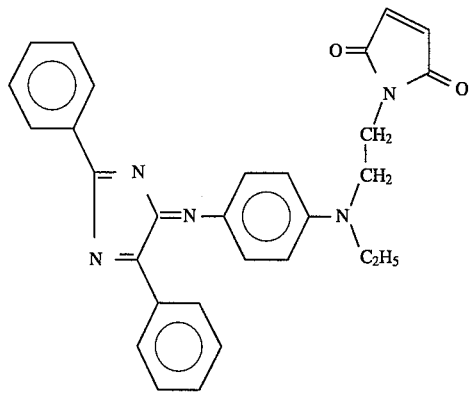
IV-16
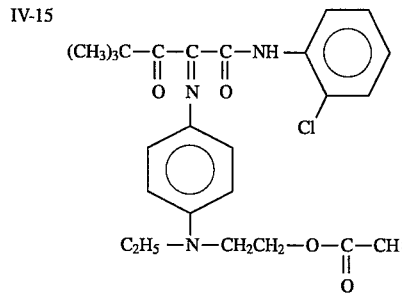

-continued
IV-17
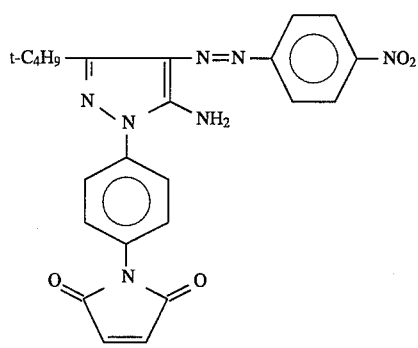
IV-18
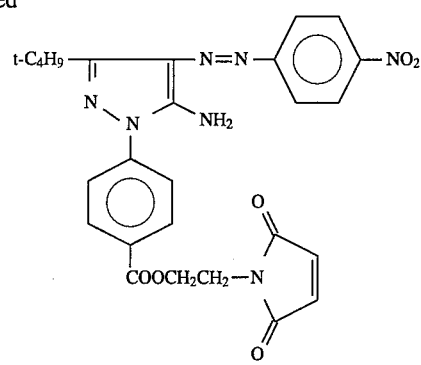
IV-19
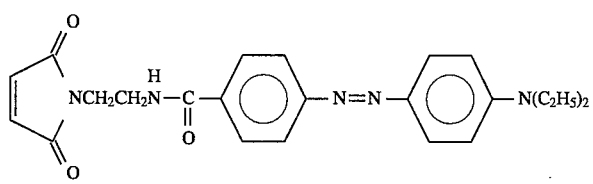
IV-20
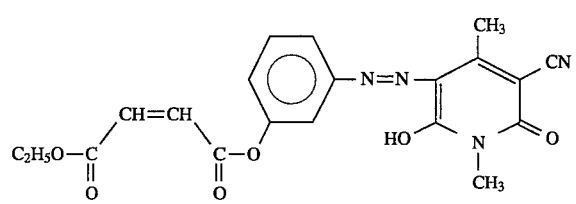
IV-21
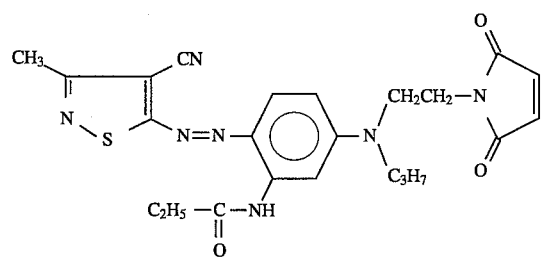
IV-22
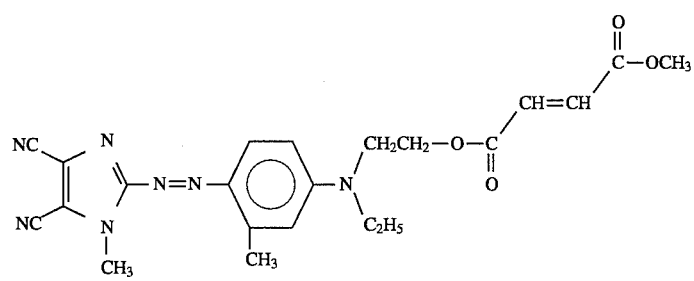
IV-23
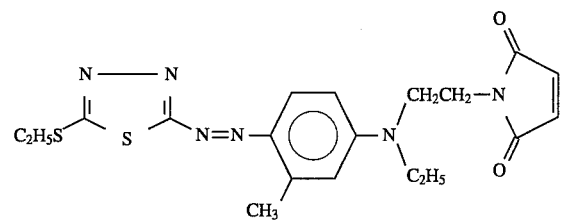
IV-24
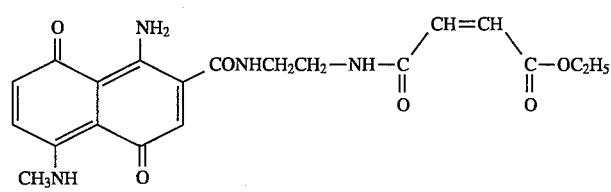

IV-25 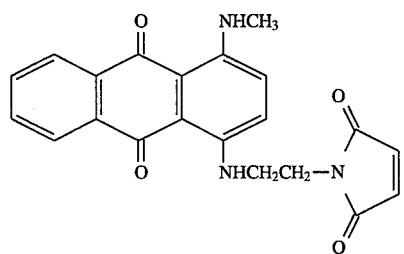 IV-26 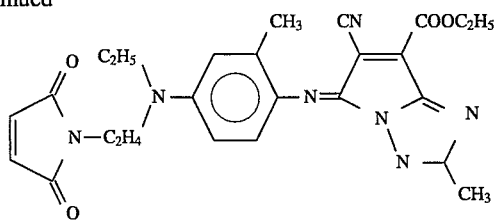
IV-27 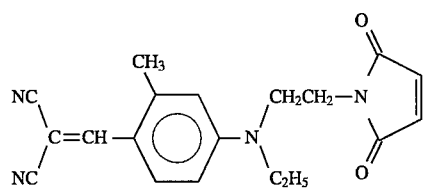 IV-28 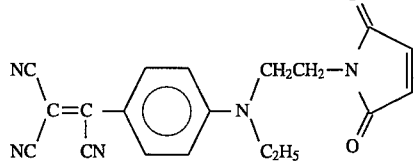
IV-29 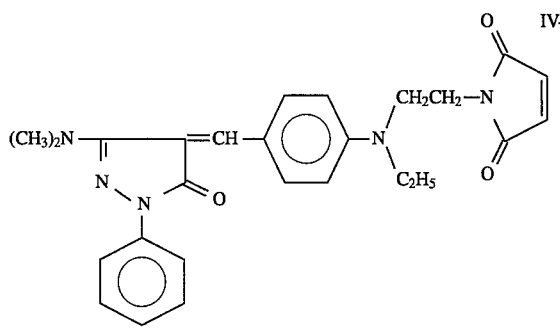 IV-30 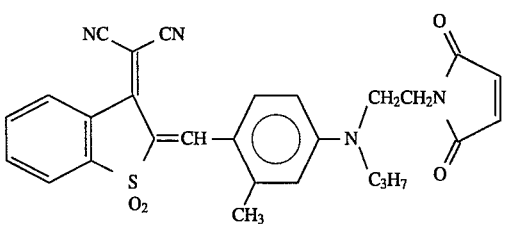
IV-31 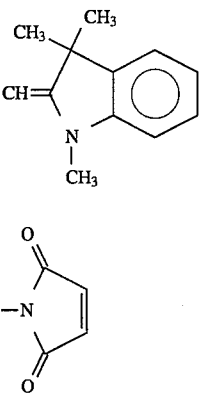
IV-32 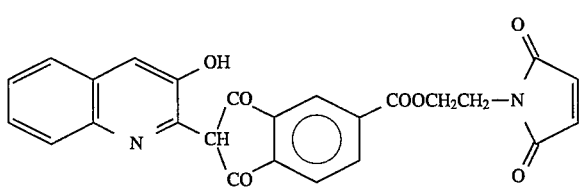
IV-33 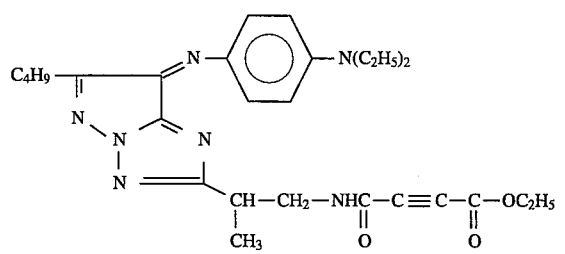

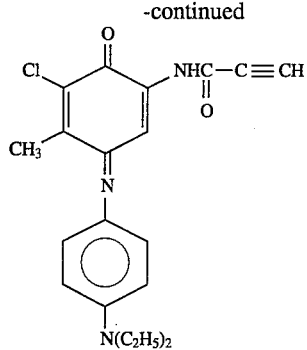 IV-34
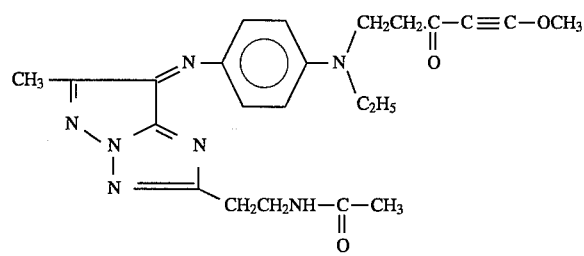 IV-35
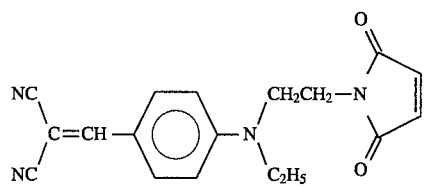 IV-36
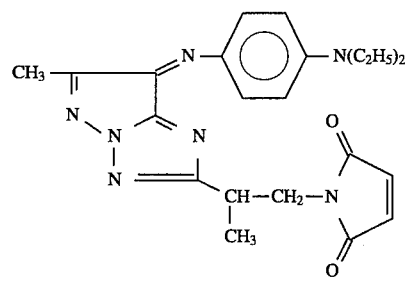 IV-37
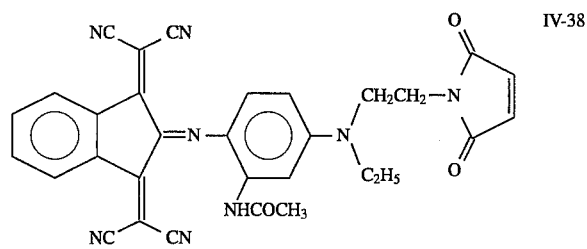 IV-38
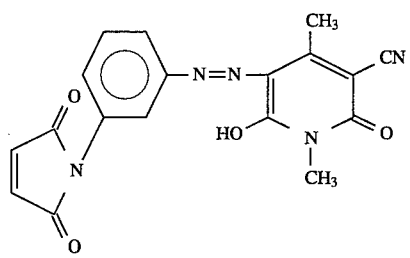 IV-39
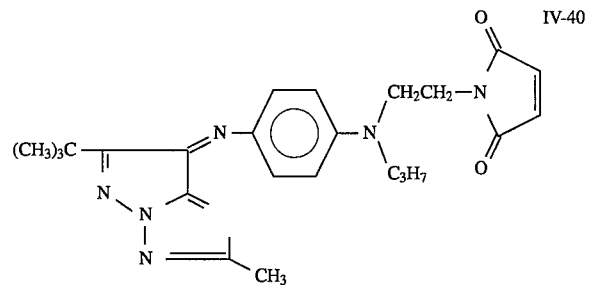 IV-40
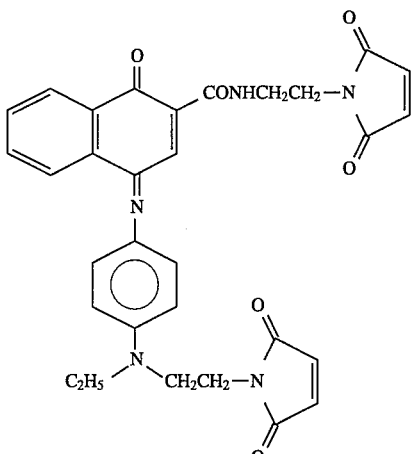 IV-41
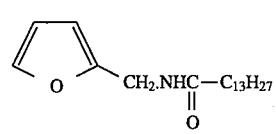 V-1
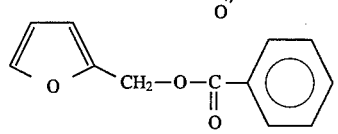 V-2

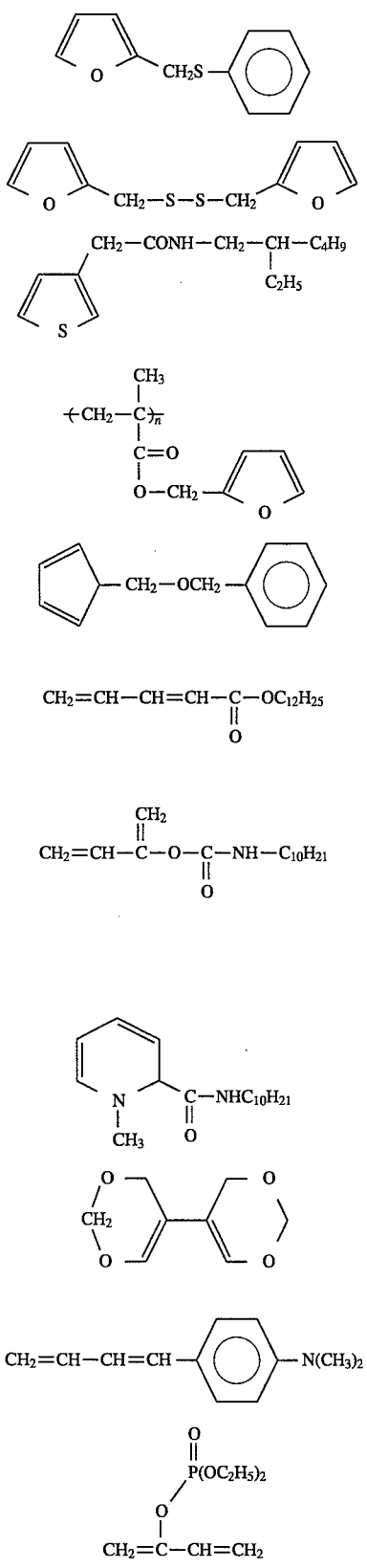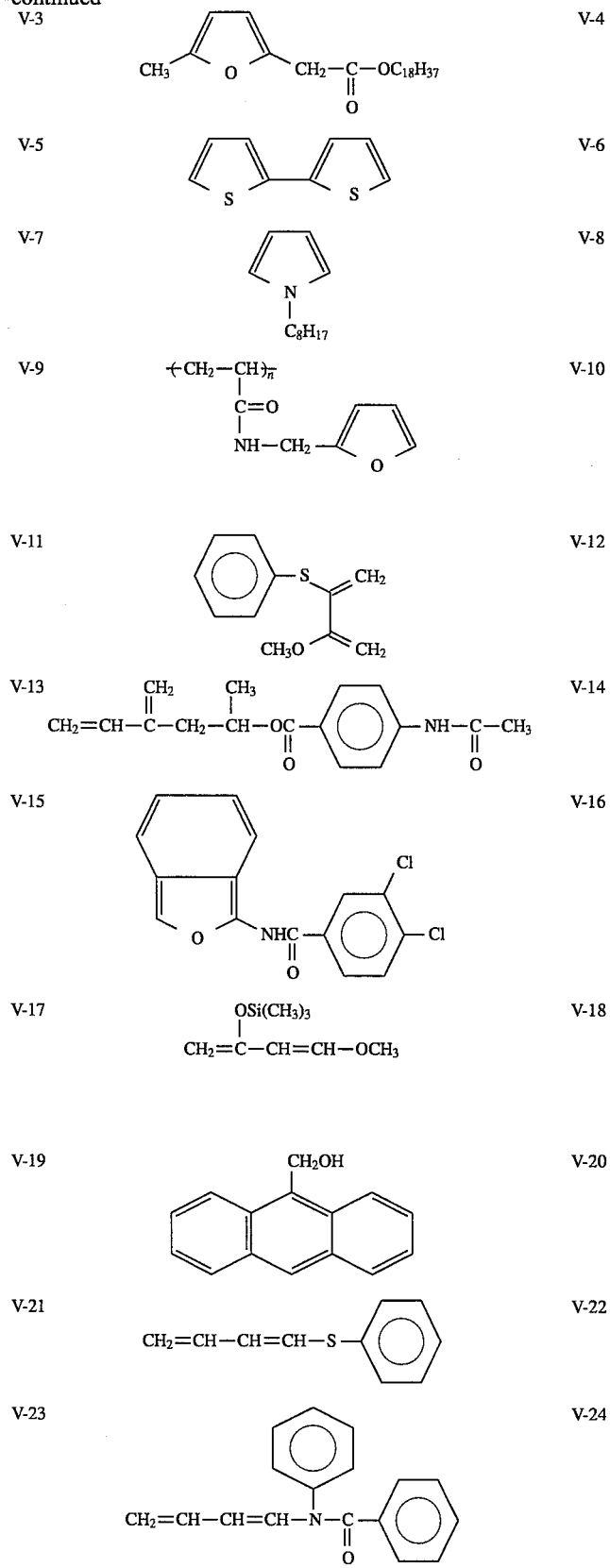

V-25 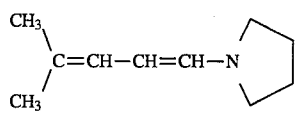
V-26 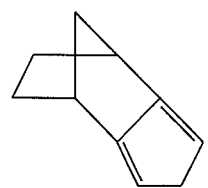
V-27 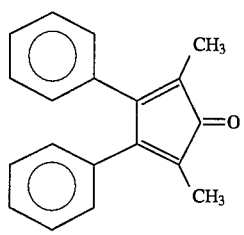
V-28 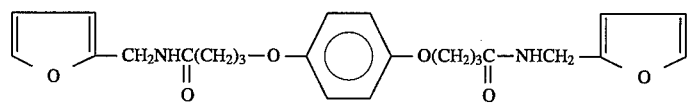
V-29 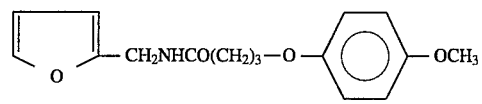
V-30 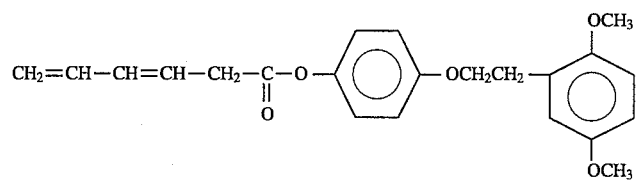
V-31 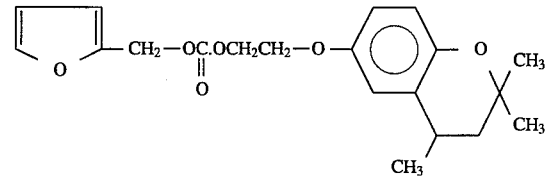
V-32 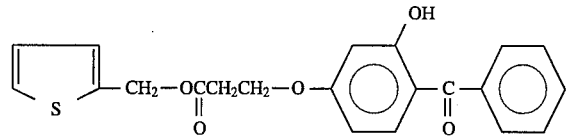
V-33 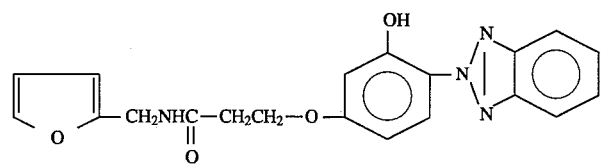
V-34 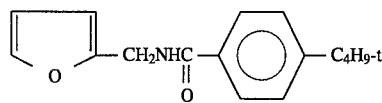
V-35 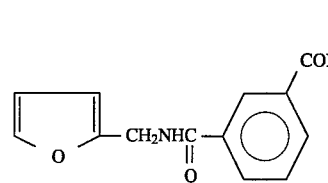

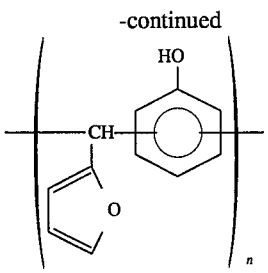

V-36

Preferred combinations are a combination of the dye which is a diene of formula (I) with a dienophile of formula (II), and a combination of the dye which is a dienophile of formula (IV) wherein Y is $CR^{13}(R^{14})=CR^{15}(R^{16})$ with a diene of formula (V). For the dye in the form of a diene, the diene moiety is preferably a furan or butadiene, while the dienophile moiety of the dienophile combined therewith is preferably a maleimide or maleate. For the dye in the form of a dienophile, the dienophile moiety and the diene moiety of the diene combined therewith are preferably as described just above. Exemplary compounds are described in Examples to be described later.

Further preferred are a combination of the dye which is a diene of formula (I) with a dienophile of formula (III) and a combination of the dye which is a dienophile of formula (IV) wherein Y is $CR^{17}\equiv CR^{18}$ with a diene of formula (V). For the dye in the form of a diene, the diene moiety is preferably as described above and the dienophile combined therewith is preferably a dienophile of formula (III) wherein each of $R^{11}$ and $R^{12}$ is a substituted alkylaminocarbonyl group or substituted alkyloxycarbonyl group. For the dye in the form of a dienophile, the dienophile moiety is preferably a dienophile of formula (IV) wherein one of $R^{17}$ and $R^{18}$ is a hydrogen atom and the other is an aminocarbonyl or oxycarbonyl derivative group and the diene moiety of the diene combined therewith is preferably as described above. Exemplary compounds are also described in Examples to be described later.

In the practice of the invention, Diels-Alder reaction is generally carried out at temperatures of 0° to 300° C., preferably 15° to 100° C. This is because it is acceptable to heat the reaction system although Diels-Alder reaction can take place at about room temperature (15° to 30° C.) ensuring a simple process. The reaction time ranges from about 1 millisecond to about 200 hours.

Through Diels-Alder reaction, the dye increases its molecular weight to about 1.3 to 4 times the initial molecular weight which is about 200 to 500 prior to reaction. The molecular weight increase is not limited to this factor range. Where the diene or dienophile to be reacted with the dye is of a polymer type (for example, V-9 in Example 7 has a molecular weight of about 100,000), the dye's molecular weight is increased to about 500 times the initial owing to the molecular weight of the polymer. In general, when such a polymer type diene or dienophile is used, the dye's molecular weight is increased to about 50 to 2,000 times the initial depending on the molecular weight of the polymer.

Whether or not it is a dye, the diene or dienophile used herein is preferably solid at room temperature (about 25° C.). More preferably the diene or dienophile has a melting point of about 50° to 250° C.

Also the diene or dienophile to be reacted with the dye should preferably have a non-diffusing group which desirably has at least 6 carbon atoms in total, especially 6 to 20 carbon atoms in total. Alternatively, the diene or dienophile may be of a polymer type as mentioned above.

The solid material used herein may be any desired one insofar as it can receive the dye. Polymers are preferred. Exemplary polymers are shown in Japanese Patent Application No. 89462/1993 (A) Resins having an ester bond (A) Resins having an ester bond Included are polyester resins obtained by condensing dicarboxylic acid components (which may have a substituent such as sulfonate and carboxyl groups) such as terephthalic acid, isophthalic acid and succinic acid with ethylene glycol, diethylene glycol, polpylene glycol, neopentyl glycol, bisphenol A, etc.; methacrylate, polybutyl methacrylate, polymethyl acrylate, and polybutyl acrylate; polycarbonate resins; polyvinyl acetate resins; styrene acrylate resins; vinyl toluene acrylate resins, etc. More illustrative examples are those described in JP-A 101395/1984, 7971/1988, 7972/1988, 7973/1988, and 294862/1985. Among commercially available products, Byron 290, Byron 200, Byron 280, Byron 300, Byron 103, Byron GK-140, and Byron GK-130 manufactured by Toyobo K.K. and ATR-2009 and ATR-2010 manufactured by Kao K.K. are useful.

(B) Resins having a urethane bond Included are polyurethane resins.

(C) Resins having an amide bond Included are polyamide resins.

(D) Resins having a urea bond Included are urea resins.

(E) Resins having a sulfone bond Included are polysulfone resins.

(F) Other resins having a highly polar bond

Included are polycaprolactone resins, styrene-maleic anhydride resins, polyvinyl chloride resins, polyacrylonitrile resins, etc.

In addition to the above-mentioned synthetic resins, mixtures or copolymers thereof may also be used.

Polyester resins, styrene-butadiene copolymers, polyvinyl acetate and acetates are preferred. The solid material may be used as such or as a coating on suitable supports, for example, paper (inclusive of resin coated paper), fabric, plastic film (e.g., polyethylene terephthalate film), metal plates, and glass plates.

In the practice of the invention, the dienophile or diene may be incorporated into the solid material by any desired technique. For example, the dienophile or diene is applied to the solid material by internal addition, impregnation or coating. Alternatively a polymer having the dienophile or diene incorporated in the backbone or side chain thereof may be used as the solid material without further treatment.

More preferably the dienophile or diene is incorporated into the solid material by preparing a coating solution containing the solid material and the dienophile or diene and applying the solution to a support to form a coating. The coating preferably has a (dry) thickness of about 1 to 50 μm. By employing such an incorporating technique, the dienophile or diene can be uniformly dispersed in the solid material, ensuring fixation of the dye. Examples of the solvent used in forming such coatings include aliphatic ketones such as acetone and methyl ethyl ketone, aromatic hydrocarbons such as toluene, and esters such as ethyl acetate. The coating solution for use in forming such coatings should preferably contain the solid material and the dienophile or diene in a total content of about 3 to 50% by weight. Alternatively the dienophile or diene may be incorporated into the solid material by adding the dienophile or diene to a spinning solution together with the solid material and spinning the solution into filaments. Spinning may be done by a conventional technique.

After the dienophile or diene is incorporated into the solid material, the weight ratio of the dienophile or diene to the solid material should preferably be from about 1/10 to about 1/1. Within this weight ratio range, the dienophile or diene is present in the solid material in an optimum amount to ensure fixation of the dye. If the amount of the dienophile or diene is smaller or the weight ratio is lower, fixation of the dye would become insufficient. If the amount of the dienophile or diene is larger or the weight ratio is higher, the dienophile or diene would be wasted.

It is not critical how to bind the dye to the solid material. For example, the dye may be dissolved in a suitable solvent to form a solution, with which the solid material is coated or impregnated. Alternatively a coating containing the dye or dye precursor is formed on a support, typically plastic film. The solid material is joined to the coating surface and heated to transfer the dye from the coating to the solid material. For the latter procedure, reference is made to Japanese Patent Application Nos. 89462/1993 and 205397/1993 as follows.

The heat transfer system includes a system of heating a heat transfer dye-providing material having a heat fusible ink layer formed on a base film by a thermal head to melt the ink to record on a heat transfer image-receiving material and a system of heating a heat transfer dye-providing material having a dye-providing layer containing a heat migratory dye formed on a base film by a thermal head to heat migrate and transfer the dye to a heat transfer image-receiving material. The latter heat migration/transfer system is easy to carry out graded recording and especially advantageous for full color recording of high image quality since the amount of the dye transferred can be controlled by changing the energy supply to the thermal head.

The heat transfer image-receiving material which is used in combination with the heat transfer dye-providing material according to the present invention includes an image-receiving layer formed on a support for receiving a dye immigrating from the dye-providing material. The image-receiving layer is preferably a coating of about 0.5 to 50 μm thick having a function of receiving a heat migratory dye immigrating from a heat transfer dye-providing material upon printing and being dyed with the heat migratory dye and containing a material capable of accepting a heat migratory dye along or along with another binder material.

In the system of the present invention wherein an image is formed by diffusion transfer of a dye, an image-receiving material is used in combination with a photosensitive material. The image-receiving material may be coated on a separate support from that for the photosensitive material or on the same support as the photosensitive material. With respect to the relationships of the image-receiving material to the photosensitive material, the support, and the white reflecting layer, the relationships described in U.S. Pat. No. 4,500,626, col. 57 are applicable herein.

Preferably polymethyl acrylate, and polybutyl acrylate; polycarbonate resins; polyvinyl acetate resins; styrene acrylate resins; vinyl toluene acrylate resins, etc. More illustrative examples are those described in JP-A 101395/1984, 7971/1988, 7973/1988, and 294/862/1985. Among commercially available products, Bryon 290, Byron 200, Byon 280, Byron 300, Byron 103, Byron GK-140, and Byron GK-130 manufactured by Toyobo K.K. and ATR-2009 and ATR-2010 manufactured by Kao K.K. are useful.

(B) Resins having a urethane bond Included are polyurethane resins.

(C) Resins having an amide resins. Included are polyamide resins.

(D) Resins having a urea bond Included are urea resins.

(E) Resins having a sulfone bond Included are polysulfone resins.

(F) Other resins having a highly polar bond

Included are polycaprolactone resins, styrene-maleic anhydride resins, polyvinyl chloride resins, polyacrylonitrile resins, etc.

In addition to the above-mentioned synthetic resins, mixtures or copolymers thereof may also be used. Preferably, the dye solution used for coating or impregnation has a dye concentration of about 0.5 to 30% by weight. The dyed coating used in the transfer procedure preferably has a (dry) thickness of about 0.2 to 10 μm and a dye content of more than about 10% by weight. Exemplary solvents for use in preparing the dye solution or the coating solution for forming a dyed coating are the same as described above.

In the practice of the invention, the ratio of the dye to the diene or dienophile should preferably be 1 or less in molar ratio, especially between 1 and 0.1 in molar ratio. This molar ratio range insures effective fixation of the dye by Diels-Alder reaction. If the amount of the dye is larger or the ratio is higher than unity, the excess of dye would be less effectively fixed. If the amount of the dye is smaller or the ratio is lower, the diene or dienophile would be wasted.

The dye fixing method of the invention can be used for dye binding in, for example, sublimation type thermal transfer processes, silver salt color diffusion transfer processes, ink jet recording processes, and dyeing processes. For this information, reference is made to JP-A 16679/1989, 98492/1990, and 20956/1992, and Dye Manual, Oct. 30, 1974, edited by the Society of Organic Synthetic Chemistry.

EXAMPLE

Examples of the present invention are given below by way of illustration and not by way of limitation. All parts are by weight. The dienes and dienophiles used in Examples have been shown in the foregoing lists.

Example 1

A resin coated paper sheet of 140-μm thick paper having 30-μm thick polyethylene laminated on each surface was furnished. Onto one surface of the paper sheet, a fixing material coating solution (1) of the following composition was coated by means of a wire bar coater to a dry thickness of 10 μm. The coating was dried in an oven at 60° C. for 30 minutes.

| Fixing material coating solution (1) | |
| --- | --- |
| Polyester resin (Byron 200, Toyobo K.K.) | 15 g |
| Dienophile II-49 | 3 g |
| Methyl ethyl ketone | 85 ml |
| Toluene | 85 ml |

Using a pipet, 0.5 ml of a 1% (w/w) ethyl acetate solution of Dye I-47 having a diene moiety was added dropwise to the fixing material.

The fixing material dyed yellow in this way was allowed to stand at room temperature (20°–30° C.) for one day. A similar polyethylene laminated paper sheet was laid on the dyed fixing material and the assembly was allowed to stand in an oven at 80° C. for 3 days. Little color was transferred to the resin coated paper.

Comparative Example 1

The procedure of Example 1 was repeated except that Dye I-47 was replaced by a comparative dye a shown below which did not undergo Diels-Alder reaction. Substantial color transfer to the resin coated paper was observed.

Comparative dye a

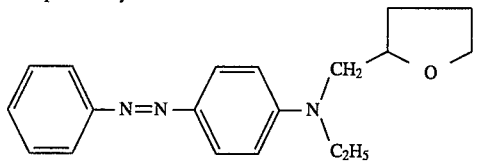

As seen from the results of Example 1 and Comparative Example 1, the dye of Example 1 capable of Diels-Alder reaction increased its molecular weight to about 1.8 times the initial at the end of reaction and minimized color transfer after dyeing as compared with the dye of Comparative Example 1 incapable of Diels-Alder reaction which was not expected to have a molecular weight increase.

Example 2

The procedure of Example 1 was repeated except that Dye I-47 was replaced by Dyes I-1, I-8, I-26, I-43, and I-44.

The solid materials were dyed cyan with Dyes I-1, I-8 and I-43, yellow with Dye I-26, and magenta with Dye I-44. In all cases, only little color transfer to the resin coated paper was observed.

Example 3

The procedure of Example 1 was repeated except that Dienophile II-49 was replaced by Dienophiles II-10, II-23, II-44, and III-2. In all cases, only little color transfer to the resin coated paper was observed.

Comparative Example 2

The procedure of Example 1 was repeated except that Dienophile II-49 was replaced by a comparative compound b or c shown below which did not undergo Diels-Alder reaction. In both cases, substantial color transfer to the resin coated paper was observed.

Comparative compound b

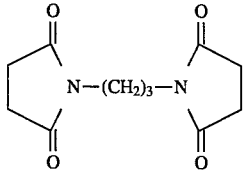

-continued

Comparative compound c

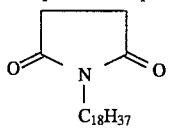

Example 4

The procedure of Example 1 was repeated except that Dienophile II-49 was replaced by Diene V-35 and Dye I-47 having a diene moiety was replaced by Dye IV-1 having a dienophile moiety. Little color transfer to the resin coated paper was observed.

Comparative Example 3

The procedure of Example 4 was repeated except that Dye IV-1 having a dienophile moiety was replaced by a comparative dye d shown below which did not undergo Diels-Alder reaction. Substantial color transfer was observed.

Comparative dye d

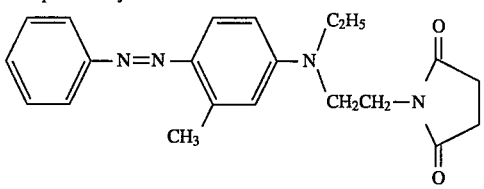

Example 5

The procedure of Example 4 was repeated except that Dye IV-1 was replaced by Dyes IV-17, IV-22, IV-37, IV-39, and IV-34.

The solid materials were dyed yellow with Dyes IV-17 and IV-39, magenta with Dyes IV-37 and IV-22, and cyan with Dye IV-34. In all cases, only little color transfer to the resin coated paper was observed.

Example 6

The procedure of Example 4 was repeated except that Diene V-35 was replaced by Dienes V-13, V-29, and V-34. In all cases, only little color transfer to the resin coated paper was observed.

Comparative Example 4

The procedure of Example 6 was repeated except that Diene V-35 was replaced by comparative compound e, f or g shown below which did not undergo Diels-Alder reaction. In all cases, substantial color transfer to the resin coated paper was observed.

Comparative compound e
$$CH_3CH_2CH_2CH_2-\underset{\underset{O}{\|}}{C}-OC_{12}H_{25}$$

Comparative compound f

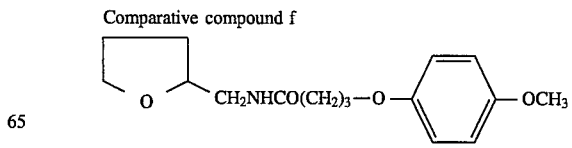

Comparative compound g

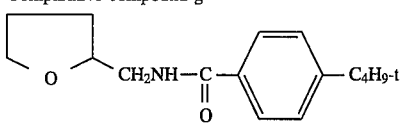

Example 7

Onto a glass plate, a fixing material coating solution (2) of the following composition was coated by means of a wire bar coater to a dry thickness of 10 μm. The coating was dried in an oven at 60° C. for 30 minutes.

| Fixing material coating solution (2) | |
| --- | --- |
| Diene V-9 (molecular weight ~100,000) | 15 g |
| Methyl ethyl ketone | 150 ml |

The fixing material was thinly brush coated with 1 ml of a 2% (w/w) ethyl acetate solution of Dye IV-1 having a dienophile moiety, thereby dyeing the fixing material.

The fixing material dyed yellow was allowed to stand at room temperature for one day. A polyethylene terephthalate (PET) film of 30 μm thick was laid on the dyed fixing material and the assembly was allowed to stand in an oven at 80° C. for 3 days. No color was transferred to the PET film.

Comparative Example 5

The procedure of Example 7 was repeated except that Dye IV-1 was replaced by a comparative dye d which did not undergo Diels-Alder reaction. Substantial color transfer was observed.

The dyes of Examples 1 to 6 increased their molecular weight to about 1.5–2.5 times the initial at the end of reaction. The dye of Example 7 increased its molecular weight to about 500 times the initial because a polymeric diene was used. Each product was identified by extracting the reaction product with acetone, isolating and purifying it by silica gel column chromatography, and analyzing it by NMR or mass spectrometry.

Next, examples of a thermal transfer process are given together with comparative examples.

Example 8

Preparation of thermal transfer dye-providing material The support used herein was a 5.5-μm thick PET film having a heat resistant lubricating layer of thermoset acrylic resin on one surface. A coating solution of the following composition was applied to the surface of the support remote from the heat resistant lubricating layer by means of a wire bar coater for forming a thermal transfer dye-providing layer having a dry thickness of 0.8 μm, obtaining a thermal transfer dye-providing material.

| Dye providing layer coating solution | |
| --- | --- |
| Dye I-1 having a diene moiety | 4 g |
| Polyvinyl butyral resin (Denka Butyral 5000-A, Denki Kagaku K.K.) | 4 g |
| Methyl ethyl ketone | 40 ml |
| Toluene | 40 ml |
| Polyisocyanate (Takenate D110N, Takeda Pharmaceuticals K.K.) | 0.2 ml |

Preparation of thermal transfer image-receiving material

There was furnished a resin coated paper sheet in the form of 140-μm thick paper having polyethylene laminated on the opposite surfaces to a thickness of 30 μm and 33 μm. A coating solution of the following composition was applied to the 30-μm polyethylene laminated surface of the resin coated paper sheet by means of a wire bar coater for forming an image-receiving layer having a dry thickness of 10 μm. The coating was dried in an oven at 100° C. for 10 minutes. There was obtained a thermal transfer image-receiving material.

| Image-receiving layer coating solution | |
| --- | --- |
| Polyester resin (Byron 200, Toyobo K.K.) | 15 g |
| Polyether-modified silicone oil (SH-3771, Toray-Dow Corning K.K.) | 1 g |
| Polyisocyanate (KP-90, Dai-Nippon Ink K.K.) | 3 g |
| Dienophile II-10 | 3 g |
| Methyl ethyl ketone | 85 ml |
| Toluene | 85 ml |

The thermal transfer dye-providing material was laid on the image-receiving material such that the dye-providing layer was in close contact with the image-receiving layer. A thermal head was placed on the support side of the thermal transfer dye-providing material and operated at an output of 0.25 W/dot, a pulse width of 0.15 to 15 msec., and a dot density of 6 dot/mm to apply heat to the assembly, thereby binding the dye imagewise to the image-receiving layer of the thermal transfer image-receiving material. That area of the thus recorded thermal transfer image-receiving material having a saturated density (Dmax) was measured for reflection density of the color image using a reflection densitometer X Rite with a status A filter. The resultant image was stored in an oven at 80° C. for one week before the image was visually observed for oozing. The cyan image had a Dmax of 2.1 and little oozing of the image was observed after hot storage.

Comparative Example 6

The procedure of Example 8 was repeated except that Dye I-1 was replaced by a comparative dye h shown below which did not undergo Diels-Alder reaction.

Comparative dye h

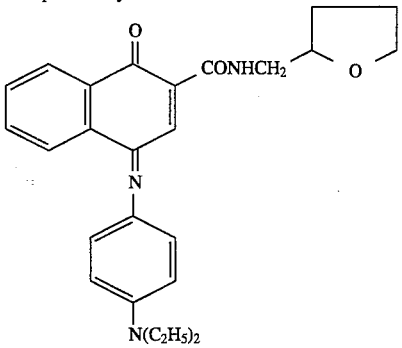

The cyan image had a Dmax of 2.0 and marked oozing of the image was observed after hot storage.

As compared with Comparative Example 6 using the dye incapable of Diels-Alder reaction, Example 8 using the dye capable of Diels-Alder reaction showed at least comparable Dmax after heat transfer and minimized image oozing after storage because of an increase of the dye molecular weight at the end of reaction to about 1.5 times the initial.

Example 9

The procedure of Example 8 was repeated except that Dye I-1 having a diene moiety was replaced by Dye IV-1 having a dienophile moiety and Dienophile II-10 was replaced by Diene V-34. The yellow image had a Dmax of 2.1 and little oozing of the image was observed after hot storage.

Comparative Example 7

The procedure of Example 9 was repeated except that Dye IV-1 was replaced by a comparative dye d which did not undergo Diels-Alder reaction. The yellow image had a Dmax of 2.1 and marked oozing of the image was observed after hot storage.

Next, examples of an ink jet recording process are given together with comparative examples.

Example 10

A dispersion was prepared from 43 parts of hollow microparticulates of a styrene-acrylate copolymer (particle size 0.3–0.4 μm), 17 parts of pyrolytic anhydrous silica (particle size 12 μm), 12 parts of a styrene-butadiene copolymer latex, 18 parts of a polyvinyl acetate latex, and parts of polymethyl methacrylate particulates (particle size about 8 μm). With stirring, a 20% (w/w) ethyl acetate solution containing 10 parts of Dienophile II-49 was added to the dispersion. The resulting coating solution was applied to a commercially available uncoated paper sheet (basis weight 64 g/m$^2$) so as to give a solids coverage of 10 g/m$^2$ by means of a wire bar coater, obtaining an ink jet recording paper (1).

By using an electrostatic acceleration type ink jet recording machine equipped with a head having a nozzle diameter of 50 μm and feeding an ink liquid A of the following composition, recording paper (1) was ink jet recorded at a dot count of 8 lines/mm.

| Ink liquid A | Parts by weight |
| --- | --- |
| Dye I-47 | 6 |
| Diethyl phthalate | 30 |
| Diisopropyl adipate | 44 |
| N,N-diethyldodecanamide | 20 |

Ink liquid A had a resistivity of $3.5 \times 10^7$ Ω.cm and a viscosity of 7.0 centipoise at 25° C. Injection of the ink liquid through the orifice was smooth enough to produce a clear yellow image of high density on recording paper (1).

The image was stored in an oven at 80° C. for one week before the image was visually observed for oozing. The image remained substantially unchanged from the initial.

Comparative Example 8

The procedure of Example 10 was repeated except that Dye I-47 in ink liquid A was replaced by a comparative dye which did not undergo Diels-Alder reaction. Marked oozing of the image was observed after the 80° C./1 week storage.

Comparative Example 9

The procedure of Example 10 was repeated except that Dienophile II-49 used in the preparation of recording paper (1) was replaced by a comparative dye i shown below which did not undergo Diels-Alder reaction. Marked oozing of the image was observed after the 80° C./1 week storage.

Comparative compound i

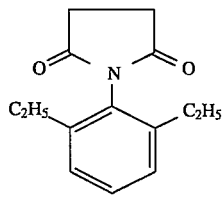

Comparative Example 10

The procedure of Example 10 was repeated except that Dienophile II-49 was omitted from the preparation of recording paper (1). Marked oozing of the image was observed after the 80° C./1 week storage.

Example 11

An ink jet recording paper (2) was prepared by the same procedure as in Example 10 except that Dienophile II-49 was replaced by Diene V-34.

By using an electrostatic acceleration type ink jet recording machine equipped with a head having a nozzle diameter of 50 μm and feeding an ink liquid B of the following composition, recording paper (2) was ink jet recorded at a dot count of 8 lines/mm.

| Ink liguid B | Parts by weight |
| --- | --- |
| Dye IV-1 | 6 |
| Diethyl phthalate | 30 |
| Diisopropyl adipate | 44 |
| N,N-diethyldodecanamide | 20 |

Ink liquid B had a resistivity of $3.4 \times 10^7$ Ω.cm and a viscosity of 7.1 centipoise at 25° C. Injection of the ink liquid through the orifice was smooth enough to produce a clear yellow image of high density on recording paper (2).

The image was stored in an oven at 80° C. for one week before the image was visually observed for oozing. The image remained substantially unchanged from the initial.

Comparative Example 11

The procedure of Example 11 was repeated except that Dye IV-1 in ink liquid B was replaced by a comparative dye which did not undergo Diels-Alder reaction. Marked oozing of the image was observed after the 80° C./1 week storage.

Comparative Example 12

The procedure of Example 11 was repeated except that Diene V-34 used in the preparation of recording paper (2) was replaced by a comparative dye g which did not undergo Diels-Alder reaction. Marked oozing of the image was observed after the 80° C./1 week storage.

Comparative Example 13

The procedure of Example 11 was repeated except that Diene V-34 was omitted from the preparation of recording paper (2). Marked oozing of the image was observed after the 80° C./1 week storage.

Next, examples of a dyeing process are given below together with comparative examples.

Example 12

A spinning machine was charged with a spinning solution consisting of 20 parts of acetate flakes having a degree of oxidation of 55%, 2 parts of Dienophile II-49 and 78 parts of acetone, which was injected through a spinneret having a diameter of 0.1 mm for spinning a filament. Using the filament, a fabric (1) was prepared.

A dye bath was prepared by adding 1.0 g of Dye I-47 and 1.0 g of sodium alkylnaphthalenesulfonate (Nekal) as a dispersant to 1 liter of water. The bath was heated to 40° C. with thorough stirring. A 10-cm square piece of fabric (1) was immersed in the bath, which was gradually heated to 85° to 90° C. and maintained at the temperature for 30 minutes for dyeing. Then fabric (1) was washed with water and dried, obtaining a yellow dyed fabric having a high density.

A white acetate fabric was laid on the dyed fabric. The assembly was stored in an oven at 80° C. for one week. Then the white fabric was separated from the dyed fabric and visually observed for color transfer from the dyed fabric. Only little color transfer was observed.

Comparative Example 14

The procedure of Example 12 was repeated except that Dye I-47 was replaced by a comparative dye a which did not undergo Diels-Alder reaction. Marked color transfer from the yellow dyed fabric to the white acetate fabric was observed.

Comparative Example 15

The procedure of Example 12 was repeated except that Dienophile II-49 was replaced by a comparative dye i which did not undergo Diels-Alder reaction. Marked color transfer from the yellow dyed fabric to the white acetate fabric was observed.

Comparative Example 16

The procedure of Example 12 was repeated except that Dienophile II-49 was omitted. Marked color transfer from the yellow dyed fabric to the white acetate fabric was observed.

Example 13

The procedure of Example 12 was repeated except that Dienophile II-49 was replaced by Diene V-35 and Dye I-47 was replaced by Dye IV-I, obtaining a yellow dyed fabric having a high density.

A white acetate fabric was laid on the dyed fabric. The assembly was stored in an oven at 80° C. for one week. Then the white fabric was separated from the dyed fabric and visually observed for color transfer from the dyed fabric. Only little color transfer was observed.

Comparative Example 17

The procedure of Example 13 was repeated except that Dye IV-1 was replaced by a comparative dye j which did not undergo Diels-Alder reaction. Marked color transfer from the yellow dyed fabric to the white acetate fabric was observed.

Comparative Example 18

The procedure of Example 13 was repeated except that Diene V-35 was replaced by a comparative compound j which did not undergo Diels-Alder reaction. Marked color transfer from the yellow dyed fabric to the white acetate fabric was observed.

Comparative compound j

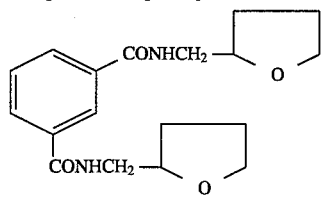

Comparative Example 19

The procedure of Example 13 was repeated except that Diene V-35 was omitted. Marked color transfer from the yellow dyed fabric to the white acetate fabric was observed.

There has been described a method for binding a dye to a solid material wherein a dye having a diene moiety is combined with a solid material containing a dienophile or a dye having a dienophile moiety is combined with a solid material containing a diene whereby the solid material having the dye bound thereto has an increased dye concentration and prevents dye diffusion during storage or with the lapse of time.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for binding a dye to a dye receiving solid material utilizing Diels-Alder reaction comprising the steps of using a dye having a diene moiety as said dye, incorporating a dienophile into said solid material, and effecting Diels-Alder reaction between said diene and said dienophile for fixing the dye to the solid material.

2. The dye fixing method of claim 1 wherein said dye having a diene moiety is of the following general formula (I):

$$A-(B-X)_n \tag{I}$$

wherein

A is a dye main portion,

B is a valence bond or a divalent linkage group,

X is $CR^1(R^2)=CR^3-CR^4=CR^5$ ($R^6$) wherein $R^1$, $R^2$, $R^3$, $R^4$, $R^5$, and $R^6$ are independently selected from a hydrogen atom and a group of non-metallic atoms, at least one of combinations $R^1$ and $R^5$, $R^3$ and $R^4$, $R^1$ and $R^2$, $R^1$ and $R^3$ (or $R^2$ and $R^3$), and $R^4$ and $R^5$ (or $R^4$ and $R^6$), taken together, may form a ring, B may be attached to X at any one of $R^1$ to $R^6$ of X, or B may be directly attached to the diene skeleton instead of any one of $R^1$ to $R^6$, and letter n is an integer of 1 to 3, and said dienophile is a compound of the following general formula (II):

$$CR^7(R^8)=CR^9(R^{10}) \qquad (II)$$

wherein $R^7$, $R^8$, $R^9$, and $R^{10}$ are independently selected from a hydrogen atom and a group of non-metallic atoms, with the proviso that all of $R^7$ to $R^{10}$ are not hydrogen atoms, and at least one of combinations $R^7$ and $R^9$ (or $R^7$ and $R^{10}$), $R^7$ and $R^8$, $R^9$ and $R^{10}$, and $R^8$ and $R^9$ (or $R^8$ and $R^{10}$), taken together, may form a ring, or a compound of the following general formula (III):

$$CR^{11}\equiv CR^{12} \qquad (III)$$

wherein $R^{11}$ and $R^{12}$ are independently selected from a hydrogen atom and a group of non-metallic atoms, with the proviso that both of $R^{11}$ and $R^{12}$ are not hydrogen atoms.

3. A method for binding a dye in a dye receiving solid material utilizing Diels-Alder reaction comprising the steps of using a dye having a dienophile moiety as said dye, incorporating a diene into said solid material, and effecting Diels-Alder reaction between said diene and said dienophile for fixing the dye to the solid material.

4. The dye fixing method of claim 3 wherein said dye having a dienophile moiety is of the following general formula (IV):

$$A-(B-Y)_n \qquad (IV)$$

wherein

A is a dye main portion,

B is a valence bond or a divalent linkage group,

Y is $CR^{13}(R^{14})=CR^{15}(R^{16})$ or $CR^{17}\equiv CR^{18}$ wherein $R^{13}$, $R^{14}$, $R^{15}$, $R^{16}$, $R^{17}$, and $R^{18}$ are independently selected from a hydrogen atom and a group of non-metallic atoms; when Y is $CR^{13}(R^{14})=CR^{15}(R^{16})$, at least one of combinations $R^{13}$ and $R^{15}$ (or $R^{13}$ and $R^{16}$), $R^{13}$ and $R^{14}$, $R^{15}$ and $R^{16}$, and $R^{14}$ and $R^{16}$ (or $R^{14}$ and $R^{15}$), taken together, may form a ring, and when Y is $CR^{17}\equiv CR^{18}$, $R^{17}$ and $R^{18}$ taken together may form a ring, B may be attached to Y at any one of $R^{13}$ to $R^{18}$ of Y, or B may be directly attached to the dienophile skeleton instead of any one of $R^{13}$ to $R^{18}$, and letter n is an integer of 1 to 3, and said diene is a compound of the following general formula (V):

$$CR^{19}(R^{20})=CR^{21}-CR^{22}=CR^{23}(R^{24}) \qquad (V)$$

wherein $R^{19}$, $R^{20}$, $R^{21}$, $R^{22}$, $R^{23}$, and $R^{24}$ are independently selected from a hydrogen atom and a group of non-metallic atoms, with the proviso that all of $R^{19}$ to $R^{24}$ are not hydrogen atoms, and at least one of combinations $R^{19}$ and $R^{23}$ (or $R^{20}$ and $R^{23}$), $R^{21}$ and $R^{22}$, $R^{19}$ and $R^{20}$, $R^{23}$ and $R^{24}$, and $R^{20}$ and $R^{24}$ (or $R^{19}$ and $R^{24}$), taken together, may form a ring.

5. A method as in claim 1, wherein said incorporating is by internal addition, impregnation or coating.

6. A method as in claim 3, wherein said incorporating is by internal addition, impregnation or coating.

* * * * *